United States Patent [19]

Nakashiba et al.

[11] Patent Number: 5,366,253
[45] Date of Patent: Nov. 22, 1994

[54] ELECTROFUSION JOINT AND HOT WATER SUPPLY HEADER USING THE SAME

[75] Inventors: Akio Nakashiba; Hiroyuki Nishimura, both of Osaka; Fumio Nagatani; Kazunori Mito, both of Kuga; Toshio Shibabuchi; Mikio Nakaoka, both of Osaka, all of Japan

[73] Assignees: Osaka Gas Co., Ltd., Osaka; Mitsui Petrochemical Industries, Ltd., Tokyo; Shinwa Sangyo Co., Ltd., Osaka, all of Japan

[21] Appl. No.: 913,632

[22] Filed: Jul. 16, 1992

Related U.S. Application Data

[62] Division of Ser. No. 462,717, Jan. 9, 1990, Pat. No. 5,150,922.

[30] Foreign Application Priority Data

| Jan. 11, 1989 | [JP] | Japan | 1-4496 |
| Mar. 24, 1989 | [JP] | Japan | 1-72331 |
| Mar. 24, 1989 | [JP] | Japan | 1-72332 |
| Mar. 24, 1989 | [JP] | Japan | 1-72333 |
| Mar. 24, 1989 | [JP] | Japan | 1-72337 |
| Mar. 24, 1989 | [JP] | Japan | 1-72340 |
| Mar. 28, 1989 | [JP] | Japan | 1-75955 |
| Mar. 28, 1989 | [JP] | Japan | 1-75960 |

[51] Int. Cl.⁵ ............................ F16L 47/02
[52] U.S. Cl. ............................ 285/21; 285/22; 285/175; 219/544; 219/535; 264/40.3
[58] Field of Search ............... 285/21, 919, 923, 22, 285/38, 175; 156/293, 212.2; 219/535, 544, 541; 264/40.3

[56] References Cited

U.S. PATENT DOCUMENTS

| Re. 29,054 | 11/1976 | Lange . | |
| 2,005,189 | 6/1935 | Herr | 285/21 |
| 2,798,745 | 7/1957 | Nelson . | |
| 2,933,428 | 4/1960 | Mueller | 285/21 X |
| 3,348,862 | 10/1967 | Leopold, Jr. et al. . | |
| 3,583,710 | 6/1971 | Burelle . | |
| 3,788,928 | 1/1974 | Wise . | |
| 3,907,625 | 9/1975 | Vogelsanger | 285/197 X |
| 3,918,748 | 11/1975 | Acda | 285/21 |
| 3,975,039 | 8/1976 | Penneck et al. . | |
| 4,050,722 | 9/1977 | Berger et al. . | |
| 4,256,988 | 3/1981 | Jones . | |
| 4,257,630 | 3/1981 | Bartell et al. | 285/21 |
| 4,353,355 | 10/1982 | Stewart . | |
| 4,436,988 | 3/1984 | Blumenkranz . | |
| 4,455,482 | 6/1984 | Grandclement | 285/21 X |
| 4,465,309 | 8/1984 | Nimke et al. | 285/915 X |
| 4,631,212 | 12/1986 | Shifflett et al. . | |
| 4,727,242 | 2/1988 | Barfield . | |
| 4,836,586 | 6/1989 | Martin | 285/381 |
| 4,869,533 | 9/1989 | Lehmann et al. | 285/93 X |
| 4,906,313 | 3/1990 | Hill . | |
| 4,913,183 | 4/1990 | Vogel et al. | 285/21 X |
| 4,927,184 | 5/1990 | Bourjot et al. . | |
| 5,030,487 | 7/1991 | Rosenzweig | 285/381 |

FOREIGN PATENT DOCUMENTS

| 0184658 | 6/1986 | European Pat. Off. . |
| 0233608 | 2/1987 | European Pat. Off. . |
| 0221396 | 5/1987 | European Pat. Off. . |
| 0333379 | 9/1989 | European Pat. Off. . |
| 2124028 | 9/1917 | France . |
| 2606487 | 5/1988 | France . |
| 2352571 | 10/1974 | Germany . |
| 8801976 | 5/1988 | Germany . |
| 0005218 | 1/1979 | Japan . |

Primary Examiner—Randolph A. Reese
Assistant Examiner—Heather Chun
Attorney, Agent, or Firm—Sherman and Shalloway

[57] ABSTRACT

The improved electrofusion joint and header for supplying hot water that perform satisfactorily at elevated temperatures as evidenced by high heat resistance, that exhibit good sealing property and that can be handled efficiently in mounting and various other operations have a crosslinked thermoplastic resin layer and at least one joining portion which comprises a non-crosslinked thermoplastic resin layer that is formed a as an integral part of the crosslinked thermoplastic resin layer in the area where it contacts a tubular member to be joined, and a heating electric wire provided either within or on the outer or inner surface of the non-crosslinked thermoplastic resin layer. Such electrofusion joint and header are applicable to any part of a piping system for supplying hot water and they will withstand use for a prolonged period.

10 Claims, 12 Drawing Sheets

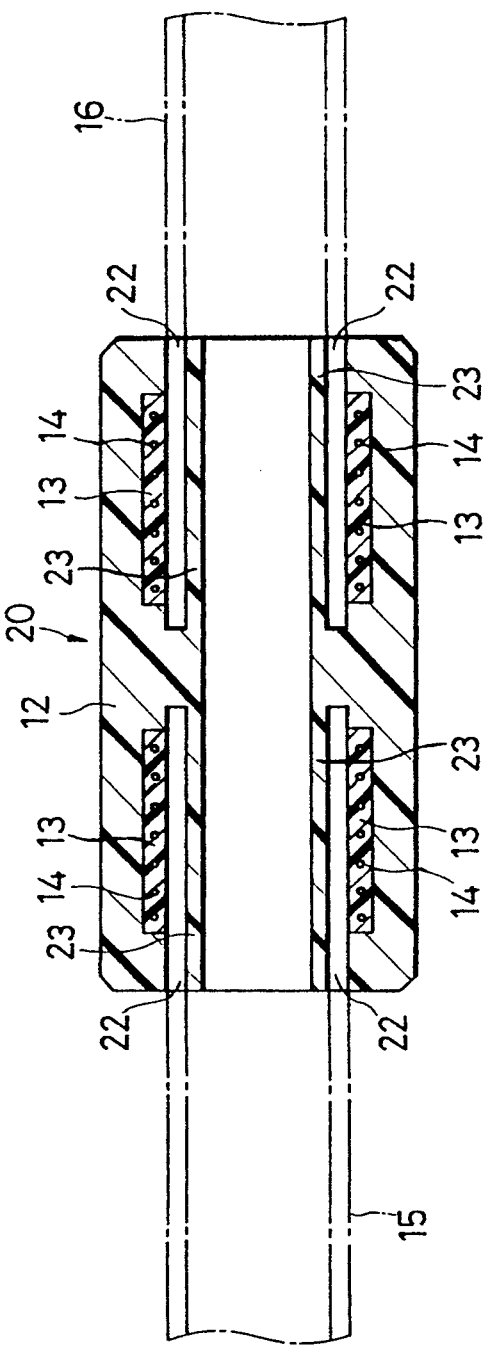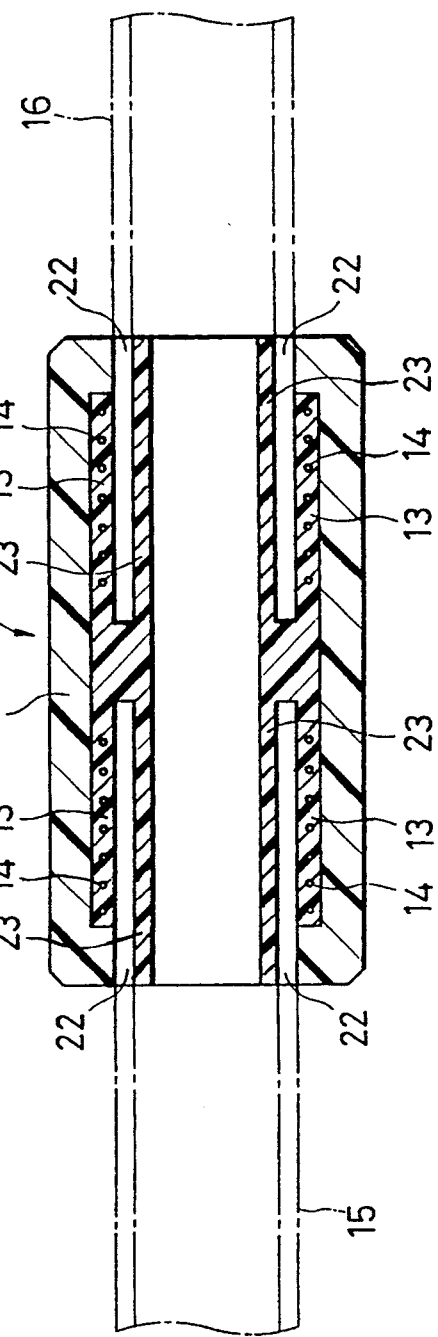

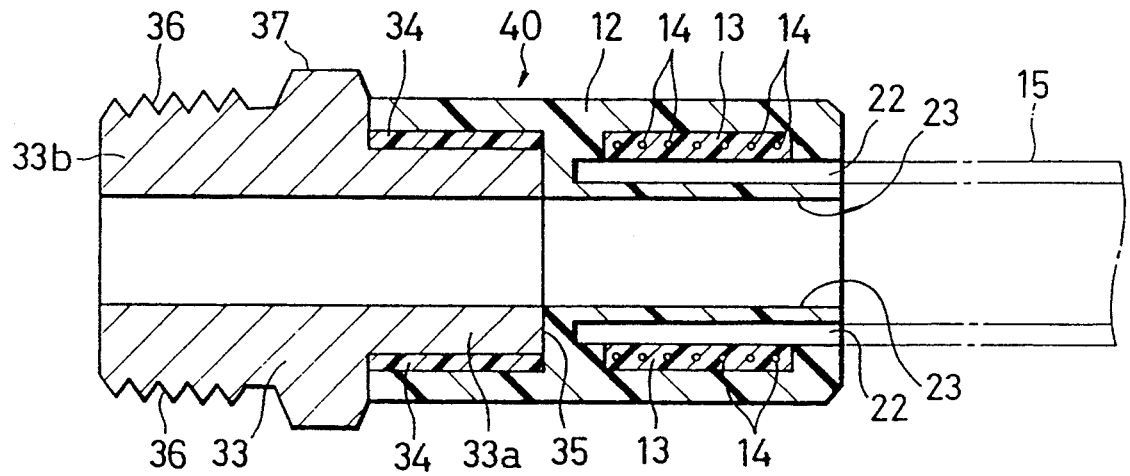
F I G. 10
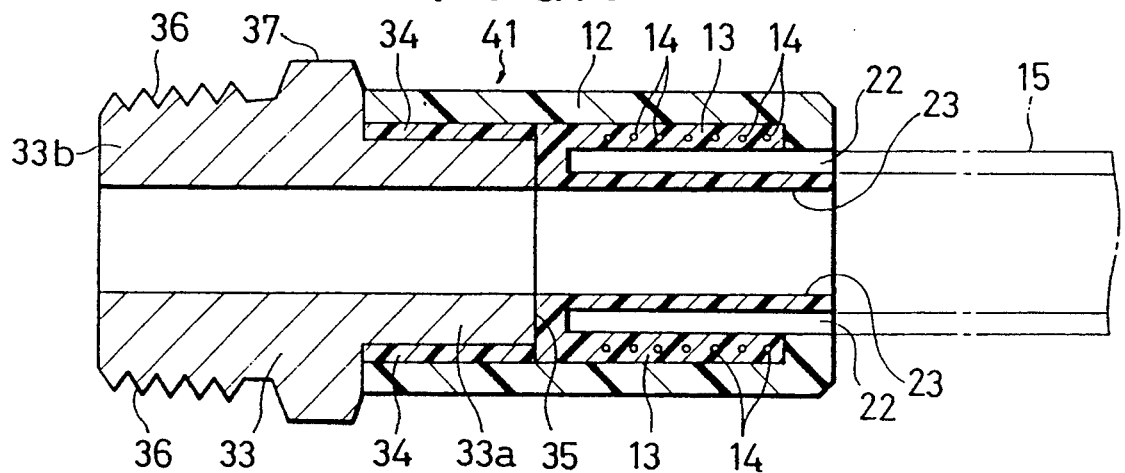
F I G. 11
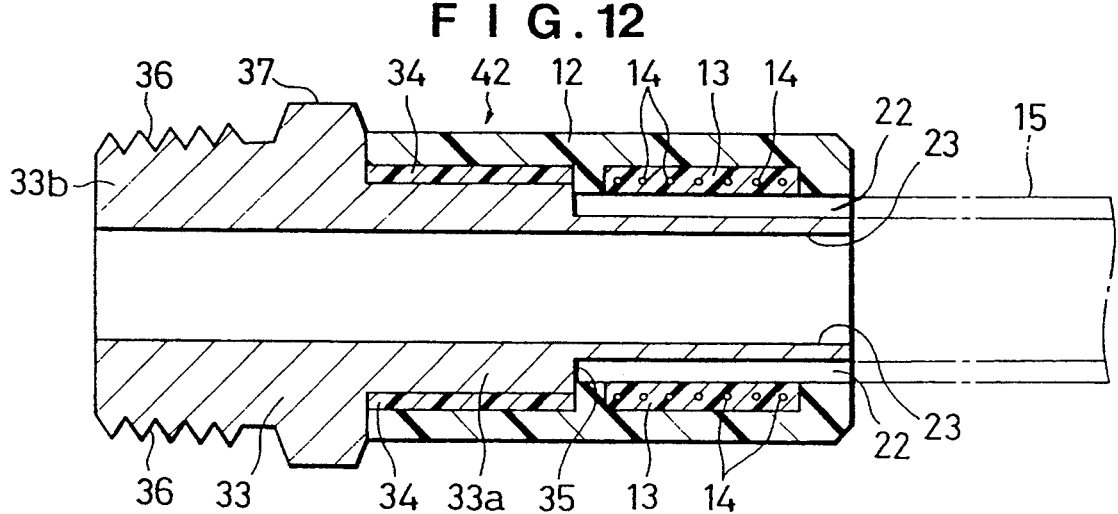
F I G. 12

FIG. 13
FIG. 14
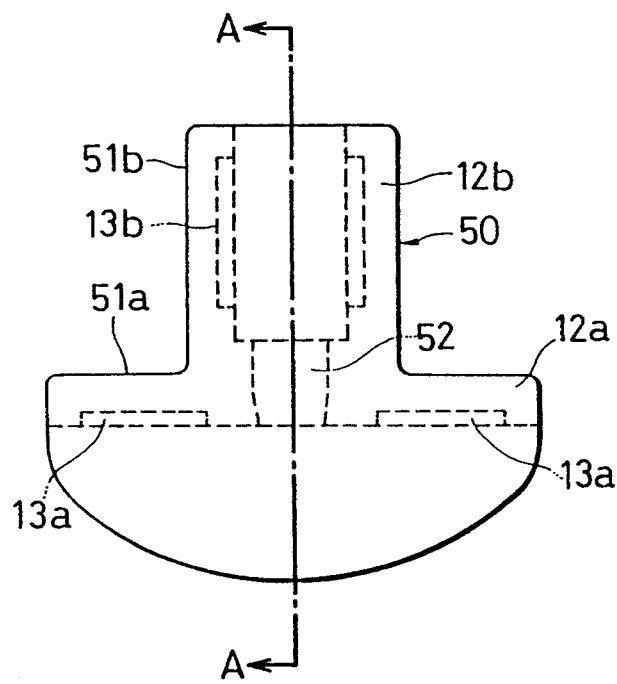
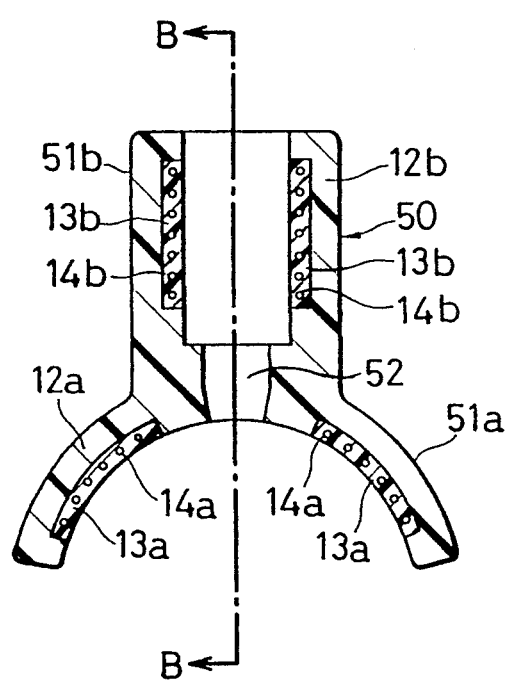
FIG. 15
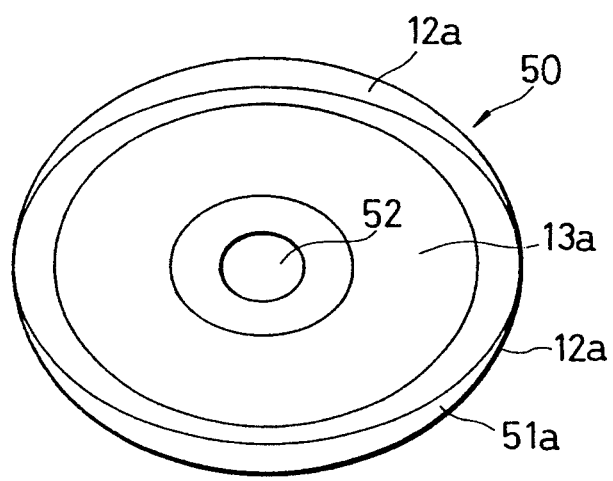

F I G. 23
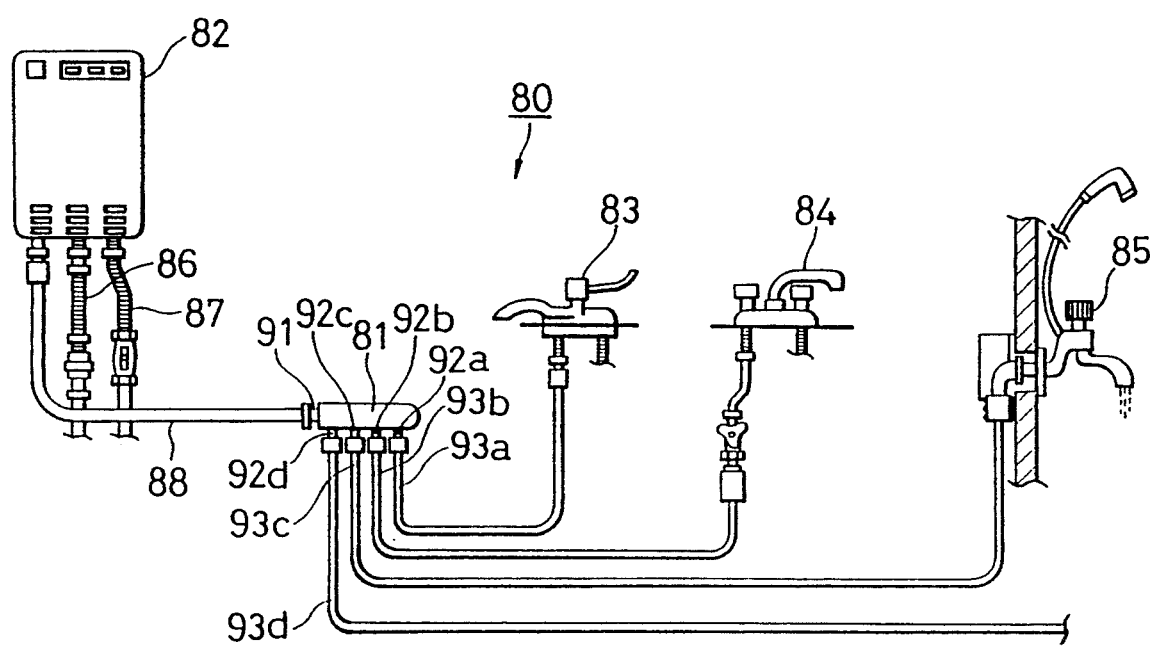

ELECTROFUSION JOINT AND HOT WATER SUPPLY HEADER USING THE SAME

This is a division of application Ser. No. 07/462,717 filed Jan. 9, 1990, now U.S. Pat. No. 5,150,922.

BACKGROUND OF THE INVENTION

The present invention relates to an electrofusion joint with which members such as polyolefin pipes, in particular, conduits for supplying hot water are joined or connected either to themselves or to the lateral side of other conduits. The present invention also relates to an electrofusion joint fitted with a connecting member for establishing connection to terminals such as nozzles on a conduit header. The present invention further relates to a header for distributing hot water from a heat source providing apparatus such as a hot water supplier to more than one site of use.

Pipes made of crosslinked polyolefins such as silane-crosslinked polyethylene are used as conduits for supplying hot water. Crosslinked polyolefins perform satisfactorily at elevated temperatures as evidenced by high heat resistance and good high-temperature creep characteristic and have a shape-retaining capability. However, unlike non-crosslinked polyolefins, crosslinked polyolefins cannot be fused to members to be joined. Hence, electrofusion joints used to connect non-crosslinked polyolefin pipes are not applicable to crosslinked polyolefin pipes. It is also impossible to form electrofusion joints using crosslinked polyolefins.

Therefore, crosslinked polyolefin pipes are currently joined by means of mechanical couplings, or joints that rely upon mechanical couplings are produced from crosslinked polyolefins. However, mechanical joints used in connecting hot water pipes which require high strength to withstand high operating pressures involve a complicated structure and cannot be handled efficiently in piping work. Further, compressive sealing performed with these mechanical joints causes the disadvantage that their performance will decrease with time as exemplified by deterioration in the reliability of sealing due to creeping in pipes or stress relaxation of pipes and sealants.

Further, if thin-walled resin pipes are connected by conventional electrofusion joints, the joined portions will thermally deform and bulge inward to restrict the fluid passage.

An electrofusion joint formed of a thermoplastic resin is known that is provided with a fine orifice in the body of the joint, through which the resin that has become molten when a member of interest is joined by fusion will come out to provide a measure for checking whether said member has completely fused to the joint (see, for example, Unexamined Published Japanese Patent Application No. 61-62696). However, being formed of a kind of thermoplastic resin, this prior art electrofusion joint has the disadvantage that the molten resin coming out of the orifice has the same color as the surrounding resin of which the joint is formed and that extrusion of this resin is difficult to identify. Thus, the time at which fusion has been completed cannot be detected precisely.

Further, connecting terminals such as nozzles on a conduit header are usually metallic and it is difficult to connect them to crosslinked thermoplastic resin pipes.

FIG. 23 is a diagram showing a piping system for supplying hot water. Shown by 81 in the diagram is a header by which hot water from a heat source providing apparatus 82 such as a hot water supplier is distributed to a faucet 83 in the kitchen, a faucet 84 in the lavatory, a faucet 85 in the bathroom, and other outlets. The heat source providing apparatus 82 receives water from a supply pipe 86, heats it by burning the gas supplied through a gas pipe 87, and supplies the heated water through a hot water main 88 to the header 81.

Header 81 is shaped of a metal in hollow form and has a single receptacle 91 on the inlet side and a plurality of receptacles of same diameter 92a, 92b, 92c, 92d, ... on the outlet side. The receptacle 91 on the inlet side is connected to the hot water main 88 by fastening means such as screws, whereas the receptacles 92a, 92b, 92c, 92d, ... on the outlet side are connected to branch pipes 93a, 93b, 93c, 93d, ... by fastening means such as screws. The branch pipes 93a, ... have such bore diameters that faucets 83, 84, 85, ... are supplied with hot water in the necessary flow rates that correspond to the capacities of the respective faucets.

The conventional header 81 has had several problems on account of the fact that it is formed of metal. First, it is liable to corrosion and is heavy. Second, it is difficult to connect to plastic pipes and is not suitable for large-scale production.

Further, the header 81 fitted with a plurality of receptacles of same diameter 92a, ... on the outlet side has to be connected to branch pipes 93a, ... of smaller diameter by means of reducers and this has been another factor that makes the header unsuitable for large-scale production.

SUMMARY OF THE INVENTION

Therefore, a first object of the present invention is to provide an electrofusion joint that uses a crosslinked thermoplastic resin such as a crosslinked polyolefin to provide enhanced heat resistance, that yet allows for fusion to insure enhanced sealing property and that can be handled with efficiency.

A second object of the present invention is to provide an electrofusion joint that has not only the features described above but also a capability for fusion without causing thermal deformation of the member to be joined.

A third object of the present invention is to provide an electrofusion joint that uses a crosslinked thermoplastic resin to provide enhanced heat resistance, that enables the operator to easily check the completion of joint fusion, thereby insuring that member to be joined is completely fused to the joint to provide enhanced sealing performance, and that can be handled with efficiency.

A fourth object of the present invention is to provide an electrofusion joint fitted with a connecting member that uses a crosslinked thermoplastic resin to provide enhanced heat resistance, that yet allows for fusion to insure enhanced sealing performance, that enables crosslinked thermoplastic resin pipes to be easily joined to connecting terminals such as nozzles on a conduit header, and that can be handled with efficiency.

A fifth object of the present invention is to provide an electrofusion joint fitted with a connecting member that has not only the features described above but also a capability for fusion without causing thermal deformation of the member to be joined.

A sixth object of the present invention is to provide an electrofusion joint that uses a crosslinked thermoplastic resin to provide enhanced heat resistance, that yet allows for fusion to insure enhanced sealing performance, that can be connected to the lateral side of a conduit at will, and that can be handled with efficiency.

A seventh object of the present invention is to provide a header for supplying hot water that is lightweight and corrosion-resistant, that can be easily connected to plastic pipes, and that is suitable for large-scale production.

A eighth object of the present invention is to provide a header for supplying hot water that is lightweight and corrosion-resistant, that can be easily connected to plastic pipes having different bore diameters, and that is suitable for large-scale production.

The above-stated objects of the present invention can be attained by a first embodiment which provides an electrofusion joint having at least one joining portion which comprises a crosslinked thermoplastic resin layer, a non-crosslinked thermoplastic resin layer that is formed as an integral part of said crosslinked thermoplastic resin layer in the area where it contacts a tubular member to be joined, and heating electric wire provided either within or on the outer or inner surface of said non-crosslinked thermoplastic resin layer.

According to a second embodiment of the present invention, said joining portion further includes a support of the member to be joined which is provided in such a way as to form a groove into which the end of said member to be joined is to be inserted.

According to a third embodiment of the present invention, said crosslinked thermoplastic resin layer and the non-crosslinked thermoplastic resin layer on the inner surface thereof have different colors, which crosslinked thermoplastic resin layer has a fine orifice that extends from its outer surface to a point close to the boundary between said crosslinked thermoplastic resin layer and said non-crosslinked thermoplastic resin layer.

According to a fourth embodiment of the present invention, said electrofusion joint further includes a connecting portion comprising a tubular crosslinked thermoplastic resin layer and a connecting member that is secured to said crosslinked thermoplastic resin layer by being inserted inwardly or outwardly of the same.

According to a fifth embodiment of the present invention, said joining portion further includes a support of the member to be joined which is provided in such a way as to form a groove into which said member to be joined is to be inserted.

According to a sixth embodiment of the present invention, said joining portion is shaped like a saddle and is a first connecting portion having a second connecting portion on its top.

According to a seventh embodiment of the present invention, there is provided a header for distributing hot water from a heat source providing apparatus, which header comprises a header body shaped of a crosslinked thermoplastic resin in a hollow form, a receptacle provided on the inlet side of said header body and at least one receptacle on the outlet side, at least part of these receptacles having a tubular layer formed of a crosslinked thermoplastic resin as an integral part of said header body, a non-crosslinked thermoplastic resin layer superposed as an integral part of said crosslinked thermoplastic resin layer in the area where it is joined to a pipe to be connected, and a heating electric wire provided either within or on the outer or inner surface of said non-crosslinked thermoplastic resin layer.

According to an eighth embodiment of the present invention, there is provided a header for distributing hot water from a heat source providing apparatus, which header comprises a header body shaped of a crosslinked thermoplastic resin in a hollow from, a receptacle provided on the inlet side of said header body, a plurality of receptacles on the outlet side, each of said receptacles on the outlet side having a tubular layer formed of a crosslinked thermoplastic resin as an integral part of said header body in such a way that said tubular resin layer has a bore diameter sufficient to admit the flow rate of hot water distributed to each receptacle.

In the first embodiment, it is preferred that the crosslinked thermoplastic resin layer in the electrofusion joint is a crosslinked polyolefin layer, with the non-crosslinked thermoplastic resin layer being a non-crosslinked polyolefin layer.

It is also preferred that the non-crosslinked thermoplastic resin layer in the electrofusion joint is formed on the inner surface of the crosslinked thermoplastic resin layer so that said non-crosslinked thermoplastic resin layer will contact the circumference of the tubular member to be joined.

In yet another preferred embodiment, the joining portion is shaped like a saddle.

In the second embodiment, it is preferred that the support of the member to be joined is formed as an integral part of said crosslinked thermoplastic resin layer or said non-crosslinked thermoplastic resin layer.

In the fourth embodiment, it is preferred that the crosslinked thermoplastic resin layer in the connecting portion is adhered to the connecting member by means of a modified thermoplastic resin.

In the fifth embodiment, it is preferred that the support of the member to be joined is formed as an integral part of the connecting member.

In the sixth embodiment, it is preferred that the second connecting portion is the joining portion.

It is also preferred that second connecting portion has a crosslinked thermoplastic resin layer and a connecting member secured to the crosslinked thermoplastic resin layer as an integral part thereof.

It is also preferred that the second connecting portion has a tubular crosslinked thermoplastic resin layer and a non-crosslinked thermoplastic resin layer superposed on the circumference of said crosslinked thermoplastic resin layer as an integral part thereof.

In the eighth embodiment, it is preferred that at least part of the receptacles on the inlet and outlet sides of the header body has a non-crosslinked thermoplastic resin layer superposed as an integral part of said crosslinked thermoplastic resin layer in the area where it is joined to a pipe to be connected, and a heating electric wire provided either within or on the outer or inner surface of said non-crosslinked thermoplastic resin layer.

BRIEF DESCRIPTION OF THE DRAWINGS

FIGS. 4 and 5 are of two examples of an electrofusion joint according to the second embodiment of the present invention;

FIGS. 10, 11 and 12 are cross sections of three examples of an electrofusion joint equipped with a connecting member according to the fifth embodiment of the present invention;

FIGS. 13 is a front view of an illustrative electrofusion joint according to the sixth embodiment of the present invention;

FIGS. 14 is a cross section taken on line A—A of FIG. 13;

FIG. 15 is a bottom view of the electrofusion joint shown in FIG. 13;

FIG. 23 is a diagram showing an illustrative piping system for supplying hot water.

DETAILED DESCRIPTION OF THE INVENTION

Figure 1:
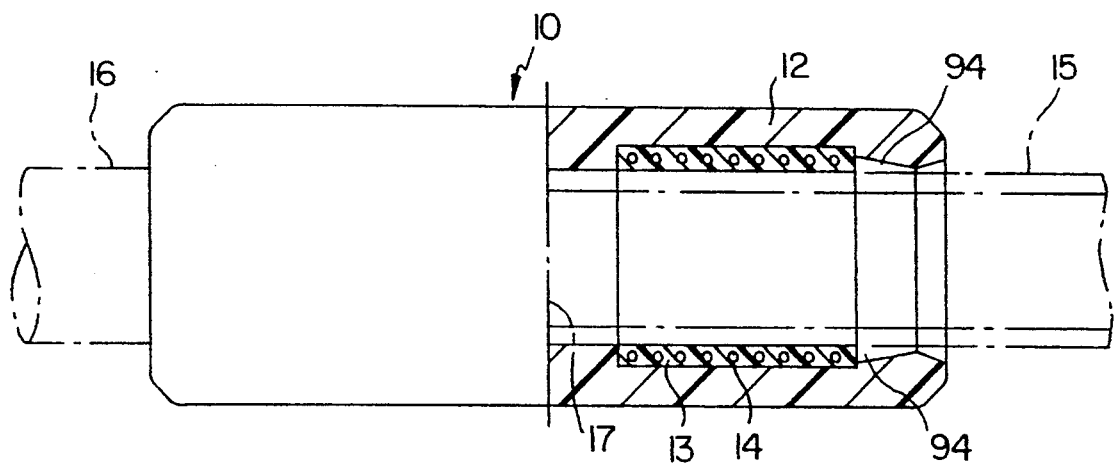
FIGS. 1, 2 and 3 are partial fragmentary front views of three examples of an electrofusion joint according to the first embodiment of the present invention.

The present invention is described in detail below.

In the electrofusion joint and the header for supplying hot water of the present invention, the crosslinked thermoplastic resin layer is adjacent to and integral with the non-crosslinked thermoplastic resin layer. Crosslinked thermoplastic resins such as crosslinked polyolefins do not fuse, so even if a crosslinked thermoplastic resin and non-crosslinked thermoplastic resin such as a non-crosslinked polyolefin are shaped by extrusion molding, injection molding or some other methods, the layers of the respective resins will not fuse together but separate from each other. Instead, if a crosslinkable thermoplastic resin yet to be crosslinked and a non-crosslinked thermoplastic resin are thermoformed into an integral unit and with the crosslinkable thermoplastic resin being subsequently crosslinked, a laminate which is an integral unit of the crosslinked thermoplastic resin and the non-crosslinked thermoplastic resin will be obtained. The electrofusion joint of the present invention uses this laminate in which the crosslinked thermoplastic resin layer unit is present.

The crosslinked thermoplastic resin has a steric structure created by crosslinking between the molecules of a thermoplastic resin. Crosslinking may be achieved with the aid of a crosslinking agent as in the case of silane-crosslinked thermoplastic resins and divinylbenzene-crosslinked thermoplastic resins. Alternatively, direct crosslinking may be effected by such means as organic peroxides and radiation.

The crosslinkable thermoplastic resins yet to be crosslinked according to the present invention comprise polyolefins which have a crosslinking ability created by reacting polyolefins with the crosslinking agent, such as a silane compound, but are not yet crosslinked. The electrofusion joint and the header for distributing hot water from a heat source providing apparatus are fabricated by thermoforming such the crosslinkable thermoplastic resin layer yet to be crosslinked and the non-crosslinked thermoplastic resin layer into an integral unit. Thereafter, the crosslinkable thermoplastic resin layer yet to be crosslinked is crosslinked by including crosslinking reaction by means of a hot water treatment and the like.

The non-crosslinked thermoplastic resin is selected from among non-crosslinkable thermoplastic resins such as polyolefins which generally are used as thermoplastic resins.

Polyolefins are preferably used as thermoplastic resins of the crosslinkable thermoplastic resin yet to be crosslinked and the non-crosslinked thermoplastic resin in the present invention and illustrative polyolefins include homo- and copolymers of α-olefins having 2–20, preferably 2–12, carbon atoms. Preferred α-olefins include ethylene, propylene, butene-1 and 4-methylpentene-1.

The present invention is hereunder described in greater detail with reference to the preferred embodiments shown in accompanying drawings. To begin with, the first embodiment of the present invention is described below with reference to FIGS. 1 to 3.

The electrofusion joint of the present invention is such that at least one its joining portion is fabricated by the following procedure: the non-crosslinked thermoplastic resin layer having a heating electric wire either within or on its outer or inner surface or having said wire wound onto its surface is inserted into an injection mold cavity; a crosslinkable thermoplastic resin is injected and laminated on said non-crosslinked thermoplastic resin layer; thereafter, the crosslinkable thermoplastic resin layer is crosslinked to form the crosslinked thermoplastic resin layer.

The thus fabricated electrofusion joint is mounted on the joining parts of members to be joined such as thermoplastic resin (e.g. polyolefin) tubes in such a way that the non-crosslinked thermoplastic resin layer will contact said members. When an electric current is applied to the electric wire, the non-crosslinked thermoplastic resin layer will melt and fuses to the member to become an integral part of the latter.

Members to be joined by the electrofusion joint of the present invention are preferably such that the surface layer or the entire portion is made of a thermoplastic resin, in particular, a miscible thermoplastic resin. Members made of non-crosslinked thermoplastic resins such as polyolefins will exhibit particularly good fusing ability.

Figure 2:
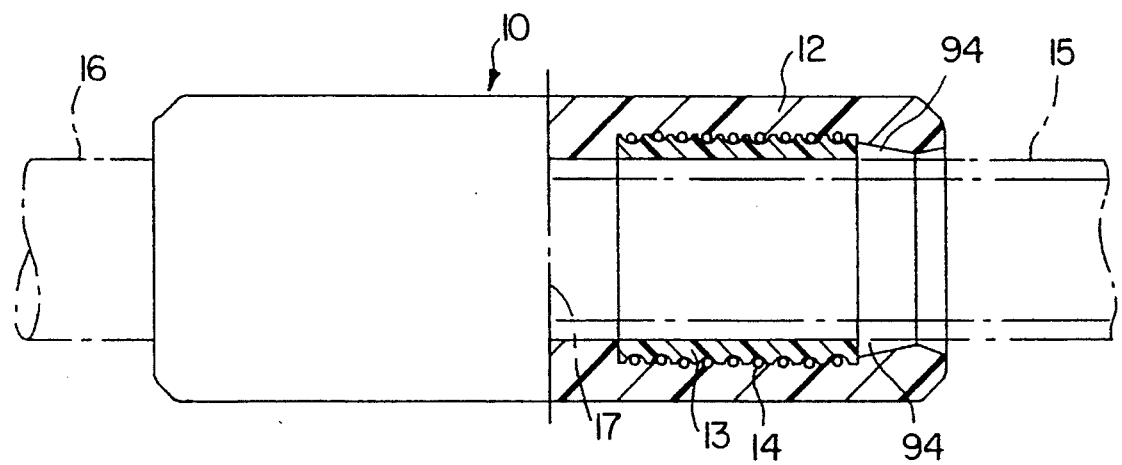
Figure 3:
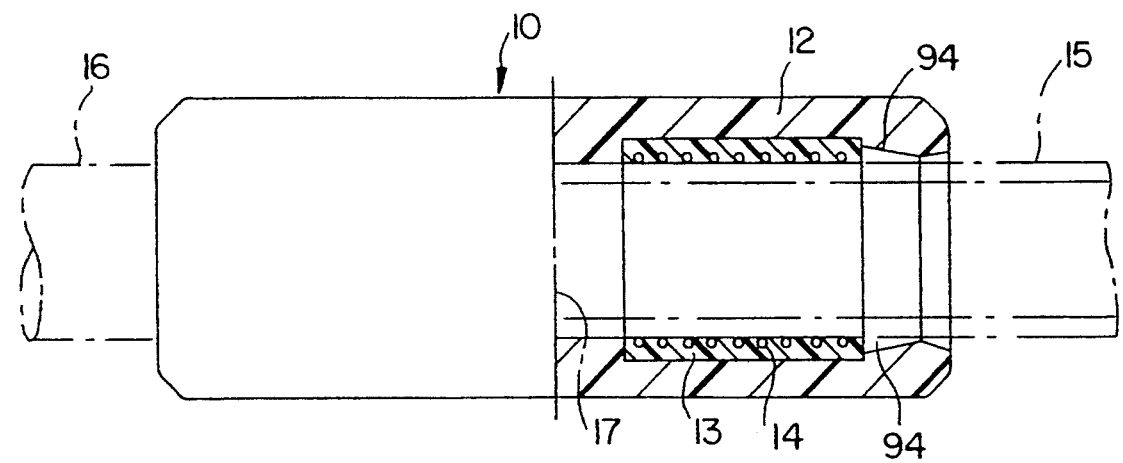

Examples of the first embodiment of the present invention are specifically described below with reference to drawings. FIGS. 1, 2 and 3 are front views of electrofusion joints, with their right half shown in cross section, according to three different examples of the first embodiment. In each of these drawing, the electrofusion joint 10 has a tubular crosslinked polyolefin layer 12 forming the main body of the joint, and two joining portions that comprise a non-crosslinked polyolefin layer 13 formed as an integral part of said crosslinked polyolefin layer 12 on the inner side thereof at each of the positions where it contacts two members to be joined 15 and 16, and a heating electric wire 14 provided either within or on the outer or inner surface of said non-crosslinked polyolefin layer 13.

The members 15 and 16 are pipes having a layer of a thermoplastic resin such as polyethylene. While they may be totally made of fusible thermoplastic resin, pipes formed of a heat-resistant material such as a crosslinked polyolefin should be coated with a fusible thermoplastic resin on the outer surface. The crosslinked polyolefin layer 12 has a tubular structure that surrounds the entire circumference of the members 15 and 16 in their mating portion 17 and nearby areas. The non-crosslinked polyolefin layer 13 is superposed on the inner surface of the crosslinked polyolefin layer 12 in areas at opposite ends thereof in its longitudinal direction that correspond to the members 15 and 16. The heating electric wire 14 is provided either within the non-crosslinked polyolefin layer 13 as shown in FIG. 1, or in its outer surface as shown in FIG. 2, or in its inner surface as shown in FIG. 3.

The electric wire 14 is fitted with leads (not shown) so that it can be connected to an external power source also not shown.

The electrofusion joint 10 having the construction described above is fabricated by the following procedure: with the heating electric wire 14 buried in or wound around the non-crosslinked polyolefin layer 13, a crosslinkable polyolefin layer containing a crosslinking agent, a crosslinking aid, a catalyst, etc. in a polyolefin is laminated over said non-crosslinked polyolefin layer 13 to form an integral unit, and thereafter, said crosslinkable polyolefin layer is crosslinked to form the crosslinked polyolefin layer 12.

The thus fabricated electrofusion joint 10 is mounted in the mating portion 17 of members 15 and 16 and nearby areas in such a way that the non-crosslinked polyolefin layer 13 will contact said members 15 and 16. When an electric current is applied to the electric wire 14 from an external power source connected by leads (not shown), the non-crosslinked polyolefin layer 13 will melt and fuses to the members 15 and 16 to become an integral part of the latter. The melted thermoplastic resin fills in recess 94 shown in FIGS. 1–3, and, when the molten resin hardens, it becomes an integral part of members 15 and 16.

In the electrofusion joint 10 of the present invention, the tubular crosslinked polyolefin layer 12 forming the main body of the joint is responsible for imparting heat resistance to the joint. Hence, the joint is capable of retaining its own shape in an effective way even if it is used to join hot water supply pipes. Further, the non-crosslinked polyolefin layer 13 which is an integral part of the crosslinked polyolefin layer 12 fuses to the members 15 and 16 to become an integral part thereof. Hence, the joint 10 has good sealing property which is maintained for a prolonged period even if it is used to join hot water pipes.

The shapes and structures of the crosslinked polyolefin layer 12 and the non-crosslinked polyolefin layer 13 are not limited to those shown in FIGS. 1–3 and various modifications are possible. In the examples shown in these drawings, members 15 and 16 meet directly each other in the mating portion 17 inside the electrofusion joint 10. If desired, the members 15 and 16 may be caused to meet a projection provided on the crosslinked polyolefin layer 12. In the examples shown in FIGS. 1–3, the non-crosslinked polyolefin layer 13 having the heating electric wire 14 is provided independently on either side of the mating portion 17 in the areas of contact with the men%bets 15 and 16. Alternatively, a continuous single layer of non-crosslinked polyolefin may be provided to cover the areas of contact with the members 15 and 16 if the electric wire 14 is to be provided on either the outer or inner surface of the non-crosslinked polyolefin layer 13, it may be wound around said non-crosslinked polyolefin layer 13 or the members 15 and 16.

In the examples shown in FIGS. 1–3, the electrofusion joint 10 connects two members 15 and 16 in a straight line with their ends meeting each other. The present invention is not limited to these examples alone and may embrace joints having more than one portion for connecting members to be joined such as an elbow joint, a T-joint and a cross joint. A blind joint closed at one end is also included within the present invention. If joints having two or more connecting portions are used, at least one of the connecting portions must be an electrofusion joining portion that comprises the crosslinked polyolefin layer 12 and the non-crosslinked polyolefin layer 13 that is integral with said crosslinked polyolefin layer 12 and which has the heating electric wire 14. Thus, the other connecting portions may have a connecting member such as a screw secured thereto. The main body of the joint need not be totally formed of the crosslinked polyolefin layer 12 but from the viewpoint of molding, it is preferred that the main body of the joint is totally formed of the crosslinked polyolefin layer 12.

Figure 24:
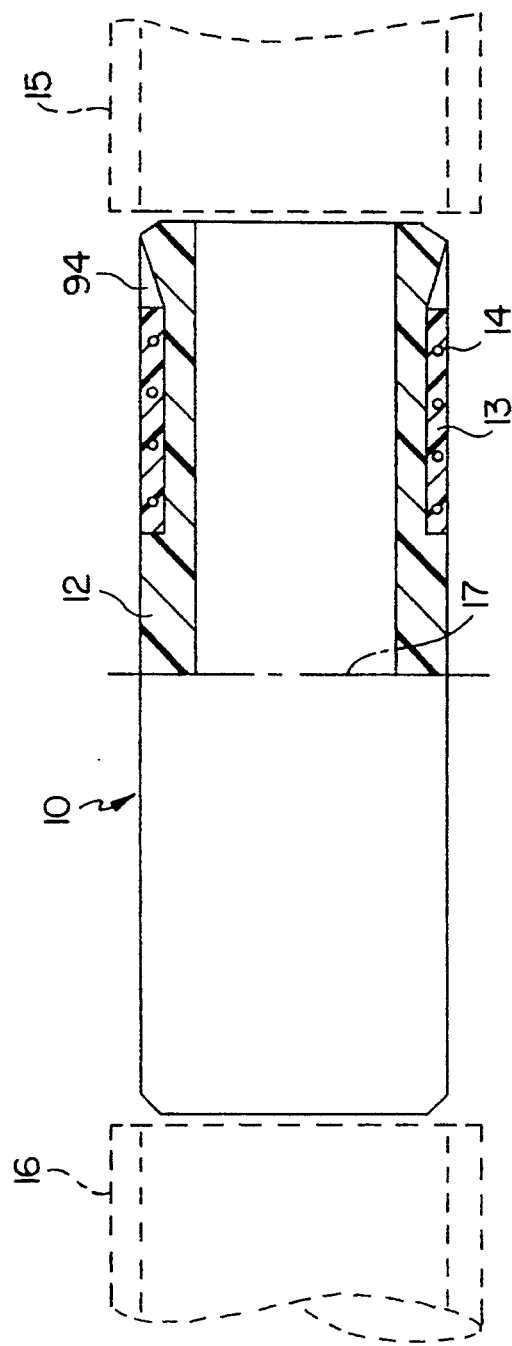
FIG. 24 is a partial fragmentary front view of an electrofusion joint prior to the insertion of the pipes over the coupling in which the non-crosslinked polyolefin layer is formed on the outer surface of the crosslinked polyolefin layer.

In the examples described above, the non-crosslinked polyolefin layer having the heating electric wire in the joining portion is formed on the inner surface of the crosslinked polyolefin layer so that it will contact the circumference of the members to be joined. However, the present invention is not limited to this case alone and the non-crosslinked polyolefin layer may be formed on the outer surface 95 of the cross-linked polyolefin layer in such a way that it will join the inside surfaces or ends of the members to be joined as shown in FIG. 24. More specifically, FIG. 24 shows the non-crosslinked polyolefin layer on the outer surface of the crosslinked polyolefin layer prior to the insertion of the pipes over the coupling.

In the examples described above, the electrofusion joint has a tubular joining portion for joining the ends of members to be joined. The present invention is not limited to this case alone and the joining portion may be shaped like a saddle so that it is capable of joining to the lateral side of a member to be joined.

As described in detail on the foregoing pages, the electrofusion joint according to the first embodiment of the present invention has a joining portion comprising a non-crosslinked thermoplastic resin layer that is formed as an integral part of a crosslinked thermoplastic resin layer and which has a heating electric wire provided either within or on its outer or inner surface. Hence, this joint performs satisfactorily at elevated temperatures as evidenced by high heat resistance and exhibits good sealing property. In addition, this joint can be handled efficiently in mounting and various other operations.

The second embodiment of the present invention is described below with reference to FIGS. 4 and 5.

The electrofusion joint according to the second embodiment of the present invention has not only the constituent elements described above in connection with the first embodiment but also a support of the member to be joined which is provided in the joining portion to form a groove into which the end of said member to be joined is to be inserted. The support is preferably provided on the side that faces the non-crosslinked thermoplastic layer. The groove into which the member to be joined is to be inserted is formed in such a way that it opens at the connecting end of the electrofusion joint. The support of the member to be joined is desirably formed as an integral part of the crosslinked thermoplastic resin layer by being made of a crosslinked or non-crosslinked thermoplastic resin. If desired, the support may be made of other materials.

As in the first embodiment, the electrofusion joint according to the second embodiment is fabricated by crosslinking a cross-linkable thermoplastic resin that has been shaped as a laminated integral part of a non-crosslinked thermoplastic resin having a heating electric wire buried in or wound on it. In this second embodiment, the support of the member to be joined may be formed as an integral part of either the crosslinkable thermoplastic resin which is to form the crosslinked thermoplastic resin layer or the non-crosslinked thermoplastic resin.

The thus fabricated electrofusion joint is used in the following manner: a member to be joined such as a thermoplastic resin tube is inserted at one end into the groove which is open at the connecting end of the joint; the member is mounted in such a way that it contacts the non-crosslinked thermoplastic resin layer and is supported by said support; when an electric current is applied to the electric wire, the non-crosslinked thermoplastic resin layer will melt and fuses to the member of interest to become an integral part of the latter. As the non-crosslinked thermoplastic resin layer melts, the member to be joined such as a thermoplastic resin tube will soften but will not deform since its inner surface is supported by its support.

Examples of the second embodiment of the present invention are described below in a specific way with reference to drawings. FIGS. 4 and 5 are cross sections of two different examples of an electrofusion joint according to the second embodiment of the present invention. Except for the groove into which the member to be joined is to be inserted and the support of said member, the electrofusion joints shown in FIGS. 4 and 5 have the same construction as the electrofusion joint 10 shown in FIG. 1 and hence, the same components are identified by like numerals and will not be described in detail.

Each of the electrofusion joints 20 and 21 shown in FIGS. 4 and 5, respectively, has a crosslinked polyolefin layer 12 forming the main body of the joint, non-crosslinked polyolefin layers 13 and heating electric wires 14. Further, these joints have supports 23 of members 15 and 16 to be joined which are provided in such a way as to form grooves 22 inwardly of the non-crosslinked polyolefin layers 13 into which the members 15 and 16 can be inserted at their ends. In the examples shown, the joining portion consisting of non-crosslinked polyolefin layer 13, heating electric wire 14, groove 22 and support 23 is provided on each side of the electrofusion joint 20 or 21.

In the electrofusion joint 20 shown in FIG. 4, the supports 23 are made of a crosslinked polyolefin and extend from the center of the crosslinked polyolefin layer 12 as an integral part thereof in such a way as to form grooves 22 between those supports and the non-crosslinked polyolefin layers 13.

The electrofusion joint 20 may be fabricated by the process described in connection with the electrofusion joint 10, except that the injection mold cavity used must be so designed as to permit the shaping of grooves 22 and supports 23.

After fabricating the electrofusion joint 20 as described above, the members to be joined 15 and 16 such as polyolefin tubes are inserted at one end into grooves 22 on opposite sides of the joint 20 and mounted in such a way that they contact the non-crosslinked polyolefin layers 13 and are supported by the supports 23. Thereafter, an electric current is applied to the electric wires 14, whereupon the non-crosslinked polyolefin layers 13 are melted and fuse to become an integral part of the members 15 and 16.

As the non-crosslinked polyolefin layers 13 melt, the members 15 and 16 which are made of thermoplastic resin will soften but will not deform since their inner surfaces are supported by the supports 23. Thus, the fluid passage of each of the members 15 and 16 will not become narrower but maintains a cross-sectional area substantially the same as before these members were joined.

As in the case of the electrofusion joint 21 shown in FIG. 5, the second embodiment of the present invention may be such that the supports 23 are formed as integral parts of the non-crosslinked polyolefin layers 13 by being made of a non-crosslinked polyolefin.

The shapes and structures of the crosslinked polyolefin layer 12, non-crosslinked polyolefin layers 13, heating electric wires 14, supports 23, etc. are not limited to those shown in FIGS. 4 and 5 and various modifications are possible.

It should be particularly noted that in the second embodiment of the present invention, the portions to be joined by the non-crosslinked polyolefin layers 13 having heating electric wires 14 are not limited to the circumferences of the members 15 and 16 and they may be the inner and outer circumferences of these members including their ends or the inner circumferences of such members.

It should also be noted that the electrofusion joint according to the second embodiment need only have at least one joining portion containing the supports 23 which are provided in such a way as to form grooves 22 into which the members 15 and 16 are to be inserted. The number of such joining portions and their shape and structure, as well as the shape of the main body of the joint, and even the structure of other joining portions are not limited in any particular way. Further, the joint may or may not have a connecting member.

As described above in detail, the electrofusion joint of the second embodiment of the present invention has a joining portion that comprises heating electric wires provided either within or on the outer or inner surface of non-crosslinked thermoplastic resin layers which are integral parts of a crosslinked thermoplastic resin layer, and a support of a member to be joined that is provided in such a way as to form a groove into which said member is to be inserted. Because of this construction, the joint performs satisfactorily at elevated temperatures as evidenced by high heat resistance and exhibits good sealing property. In addition, this joint is capable of connecting members without causing their deformation and it can be handled efficiently in mounting and various other operations.

The third embodiment of the present invention is described below with reference to FIG. 6. The electrofusion joint according to the third embodiment of the present invention is the same as the one of the first or second embodiment except that the outer crosslinked thermoplastic resin layer and the inner non-crosslinked thermoplastic resin layer have different colors, which crosslinked thermoplastic resin layer has a fine orifice that extends from its outer surface to a point close to the boundary between said crosslinked thermoplastic resin layer and the inner non-crosslinked thermoplastic resin layer.

When the non-crosslinked thermoplastic resin layer fuses to a member to be joined, the interior of said resin layer is melted to expand by the heat supplied from the current carrying electric wire and the pressure in the molten resin layer will increase. When satisfactory conditions of fusion are reached, the melt of non-crosslinked thermoplastic resin will come out of the fine orifice to indicate the point of time at which the fusion was completed. The extruding non-crosslinked thermoplastic resin has a different color than the surrounding crosslinked thermoplastic resin layer and hence can be readily indentified. The crosslinked thermoplastic resin will not become fluid but remains as a gel even if it is melted, and only the non-crosslinked thermoplastic resin will become fluid and come out of the orifice. The melted thermoplastic resin fills in recesses 94 in FIGS. 6 and 7, and, when it hardens, becomes an integral part of members 15 and 16.

The third embodiment of the present invention is described below specifically with reference to FIG. 6, which is a front view of an electrofusion joint, with its right half shown in cross section, according to an example of the third embodiment. This electrofusion joint has such a structure that its right half is symmetric to its left half.

Figure 6:
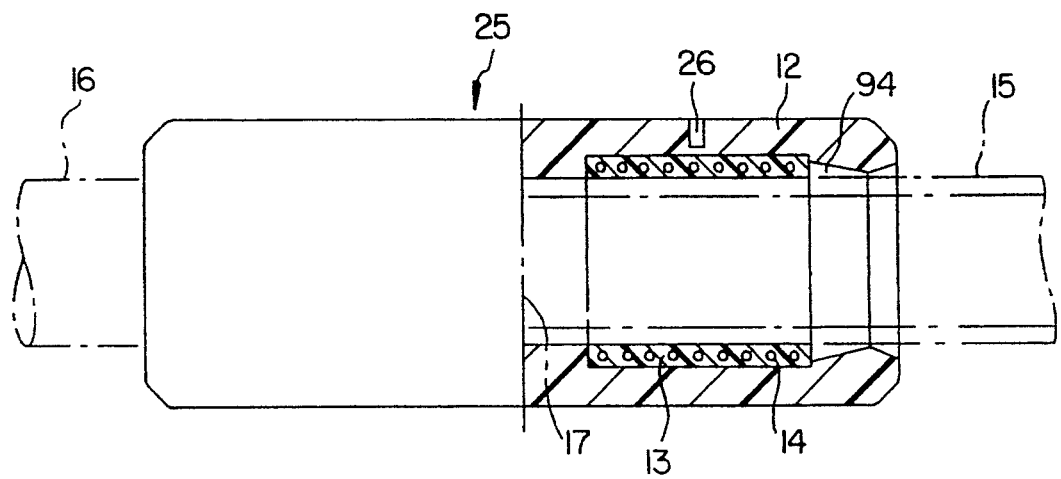
FIGS. 6 is a partial fragmentary front view of an example of an electrofusion joint according to the third embodiment of the present invention.

Except for the colors of the outer and inner layers and the presence of a fine orifice, the electrofusion joint shown by 25 in FIG. 6 has the same construction as the electrofusion joint 10 shown in FIG. 1, so the same components are identified by like numerals and will not be described in detail.

In the electrofusion joint 25 shown in FIG. 6, the crosslinked polyolefin layer has not only a different color than the non-crosslinked polyolefin layer 13 but also a small orifice 26 that extends from its outer surface to a point close to the boundary between said layer 12 and the non-crosslinked polyolefin layer 13. The orifice 26 is formed simultaneously with the time when the non-crosslinked polyolefin layer 13 is laminated as an integral part of a yet to be cross-linked polyolefin layer The second polyolefin layer is then crosslinked to form the crosslinked polyolefin layer 12.

After fabricating the electrofusion joint 25 in the manner described above, members to be joined 15 and 16 such as polyolefin tubes are mounted in such a way that the polyolefin layers 13 will contact the members 15 and 16. Thereafter, an electric current is applied to the electric wires 14 through leads from an external power source not shown, the non-crosslinked polyolefin layers 13 will melt and fuse to become integral parts of the members 15 and 16.

When fusion occurs, the non-crosslinked polyolefin layers 13 will be melted to expand by the heat supplied from the electric wires 14 and the pressure in the melt of non-crosslinked polyolefin layers 13 will increase. When satisfactory conditions of fusion are reached, the melt of non-crosslinked polyolefin will come out of the fine orifices 26 to indicate the time at which the fusion was completed. The extruding non-crosslinked polyolefin has a different color than the crosslinked polyolefin layer 12 and hence can be readily identified. The crosslinked polyolefin layer 12 will not become fluid but remains as a gel even if it is melted and only the non-crosslinked thermoplastic resin will become fluid. Hence, the point of time at which fusion was completed can be correctly indicated, allowing the operator to stop the application of current to the electric wires 14 at the right time.

The electrofusion joints according to the first and second embodiments of the present invention may be used as the joint of the third embodiment as long as the outer crosslinked thermoplastic resin has a fine orifice that extends from its outer surface to a point close to the boundary between said crosslinked thermoplastic resin layer and the non-crosslinked thermoplastic resin layer having a different color. The joining portion may be tubular or shaped like a saddle as will be described hereinafter. The other joining portion which is or may be fitted with a screw or some other connecting member to establish mechanical coupling to a member to be joined.

As described above in detail, according to the third embodiment of the present invention, a crosslinked thermoplastic resin layer has a non-crosslinked thermoplastic resin layer as an integral part that has a different color and which has a heating electric wire provided either within or on the outer or inner surface thereof. Further, said crosslinked thermoplastic resin layer has a fine orifice that extends from its outer surface to a point close to the boundary between the two resin layers. This allows the operator to check in an easy and exact way the point of time when the fusion of joint was completed, thereby insuring that members to be joined are completely fused to the joint. Thus, the electrofusion joint according to the third embodiment of the present invention will perform satisfactorily at elevated temperatures as evidenced by high heat resistance and exhibits good sealing property. In addition, the joint can be handled with efficiency in mounting and various other operations.

The fourth embodiment of the present invention is described below with reference to FIGS. 7 to 9. The electrofusion joint according to the fourth embodiment is characterized in that at least one of the portions for establishing connection to other members of interest in the electrofusion joint of the first embodiment is a connecting portion having a tubular crosslinked thermoplastic resin layer and a connecting member that is inserted inwardly or outwardly of said crosslinked thermoplastic resin layer and secured thereto either mechanically by a screw or some other means or chemically by means of an adhesive material such as a modified thermoplastic resin.

Illustrative connecting members that can be used in the fourth embodiment of the present invention include metal tubes and non-metallic tubes such as ceramic tubes and resin tubes having at one end a screw or some other mechanical means which allow for connection to connecting terminals. Such connecting members are preferably secured to the crosslinked thermoplastic resin layer by means of an adhesive material such as a modified thermoplastic resin. The adhesive material is preferably provided between the connecting member and the crosslinked thermoplastic resin layer. If desired, the adhesive material may be dispersed in the crosslinked thermoplastic resin layer.

Illustrative modified thermoplastic resins that can be used in the fourth embodiment of the present invention are polyolefins that have been modified by graft copolymerization with modifying monomers including unsaturated carboxylic acids such as acrylic acid and maleic acid, unsaturated carboxylic acid anhydrides such as maleic anhydride, amides of unsaturated carboxylic acids, and unsaturated epoxides such as glycidyl methacrylate. The content of a modifying monomer in the modified thermoplastic resin is desirably within the range of from 0.001 to 5 wt % of the modified thermoplastic resin.

The electrofusion joint fitted with a connecting member according to the fourth embodiment of the present invention may be fabricated by the following procedure: at least two components, i.e., the non-crosslinked thermoplastic resin layer having a heating electric wire provided either within or on its outer or inner surface and a connecting member having a coating of an adhesive material such as a modified thermoplastic resin, are inserted into an injection mold cavity; a crosslinkable thermoplastic resin is injected and laminated on said non-crosslinked thermoplastic resin layer and said connecting member to form an integral assembly; thereafter, the crosslinkable thermoplastic resin layer is crosslinked to form the crosslinked thermoplastic resin layer. If desired, the adhesive material need not be coated on the connecting member but may be dispersed in the crosslinkable thermoplastic resin which is to be injected into the mold cavity.

The thus fabricated electrofusion joint is used in the following manner: the connecting member in the connecting portion is joined to a connecting terminal such as a nozzle on a conduit header; at the same time, a member to be joined such as a thermoplastic resin tube is mounted in such a way that it contacts the non-crosslinked thermoplastic resin layer in the joining portion; when an electric current is applied to the electric wire from an external power source connected by a lead, the non-crosslinked thermoplastic resin layer will melt and fuses to the member of interest to become an integral part of the latter. By following this procedure, the metallic connecting terminal can be connected to the resin tube in a leak-free and reliable manner.

The electrofusion joint fitted with a connecting member according to the fourth embodiment of the present invention is described below with reference to the preferred examples depicted in drawings. FIG. 7 is a cross section of one example of the electrofusion joint fitted with a connecting member. As shown in this diagram, the electrofusion joint indicated by 30 has the same construction as the electrofusion joint 10 shown in FIG. 1 except that the connecting portion on its left side is fitted with a connecting member 33. Hence, the same components are identified by like numerals and will not be detailed in detail.

Figure 7:
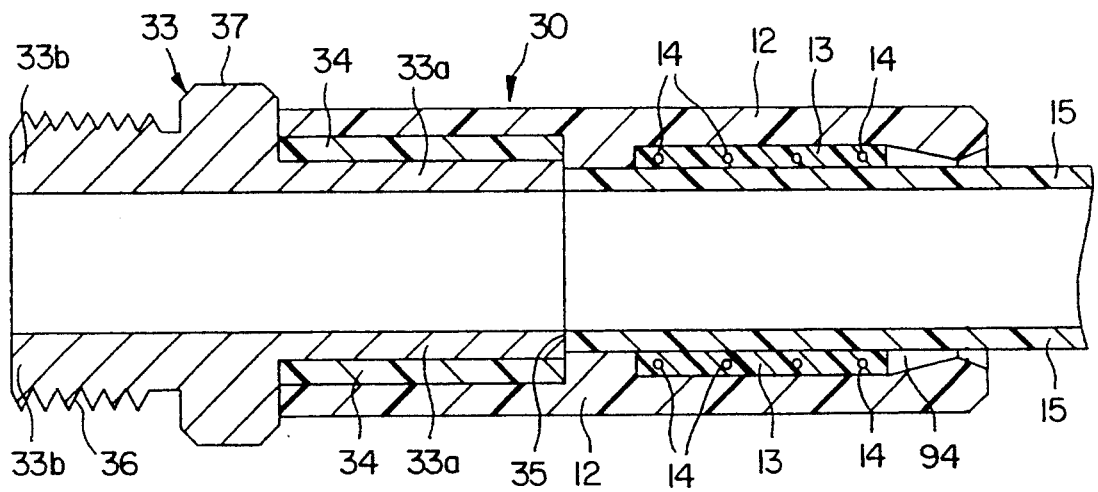
FIGS. 7, 8 and 9 are cross sections of three examples of an electrofusion joint equipped with a connecting member according to the fourth embodiment of the present invention.

The electrofusion joint 30 shown in FIG. 7 has a tubular crosslinked polyolefin layer 12, a joining portion comprising a non-crosslinked polyolefin layer 13 formed as an integral part of said crosslinked polyolefin layer 12 on the inner side of one end thereof at a position where it contacts a member to be joined 15, and a heating electric wire 14 provided either within or on the outer or inner surface of said non-crosslinked polyolefin layer 13, a connecting member 33 secured to the other end of said crosslinked polyolefin layer 12 by being inserted inwardly of the same, and a modified polyolefin layer 34 serving as an adhesive material which is provided between the inserted portion 33a of the connecting member 33 and the crosslinked polyolefin layer 12. The crosslinked polyolefin layer 12 has a tubular structure that surrounds the entire circumference of the member 15 and the inserted portion 33a of the connecting member 33 in their mating portion 35 and nearby areas. The non-crosslinked polyolefin layer 13 is superposed on the inner surface of the crosslinked polyolefin layer 12 in an area at one end thereof in its longitudinal direction that corresponds to the member 15. The electric wire 14 is buried in the non-crosslinked polyolefin layer 13.

The connecting member 33 is a metal tube which has a screw 36 formed as a mechanical connecting portion in a projection 33b on the side opposite to the inserted portion 33a. A hexagonal flange 37 which is to be gripped with a spanner is formed midway between 33a and 33b. The modified polyolefin layer 34 extends on the entire circumference of the space between the inserted portion 33a of the connecting member 33 and the crosslinked polyolefin layer 12 so as to adhere them together.

The electrofusion joint 30 having the construction described above is fabricated by the following procedure: the non-crosslinked polyolefin layer 13 having the heating electric wire 14 either buried within or in its outer or inner surface or wound around its surface, and the inserted portion 33a of the connecting member 33 coated with the modified polyolefin layer 34 on the outer surface are inserted into an injection mold cavity; subsequently, a crosslinkable polyolefin containing a crosslinking agent, a crosslinking aid, etc. in a polyolefin is injected and laminated on the non-crosslinked polyolefin layer 13 and the connecting member 33 to form an integral assembly; and thereafter said crosslinkable polyolefin layer is crosslinked to form the crosslinked polyolefin layer 12.

The so fabricated electrofusion joint 30 is connected at one end to a connecting terminal such as a nozzle on a conduit header by fitting the screw 36 in the projection 33b of the connecting member 33 into said terminal. Subsequently, the member to be joined 15 such as a polyolefin tube is inserted into the other end of the joint 30 inwardly of the non-crosslinked polyolefin layer 13 until it contacts the inserted portion 33a of the connecting member 33. Thereafter, an electric current is applied to the electric wire 14 from an external power source connected by a lead not shown, whereupon the non-crosslinked polyolefin layer 13 is melted and fuses to become an integral part of the member 15.

As in the first embodiment, the electrofusion joint 30 described above has the tubular crosslinked polyolefin layer 12 responsible for imparting heat resistance to the joint, and hence it is capable of retaining its own shape in an effective way even if it is used to join hot water pipes. Further, the non-crosslinked polyolefin layer 13 which is an integral part of the crosslinked polyolefin layer 12 together with the connecting member 33 fuses to the member 15 to become an integral part thereof. Hence, the joint has good sealing property which is maintained for a prolonged period even if it is used to join hot water pipes.

Figure 8:
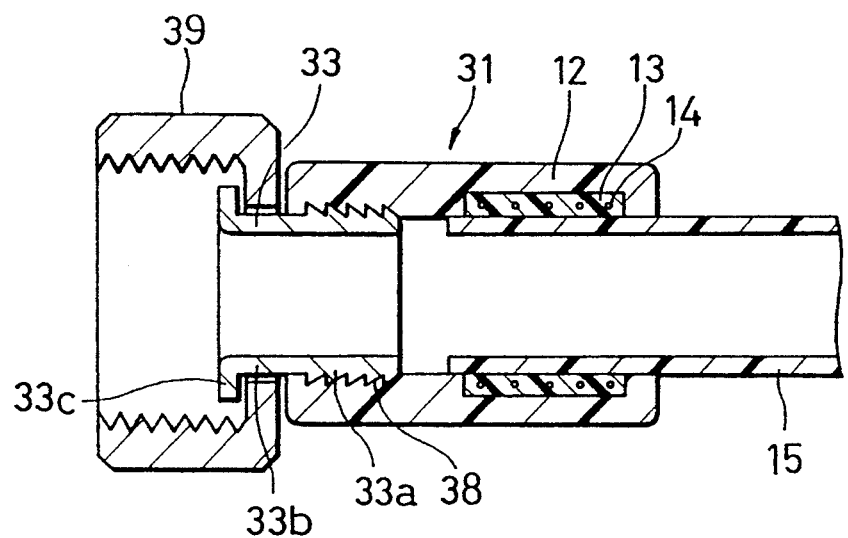
Figure 9:
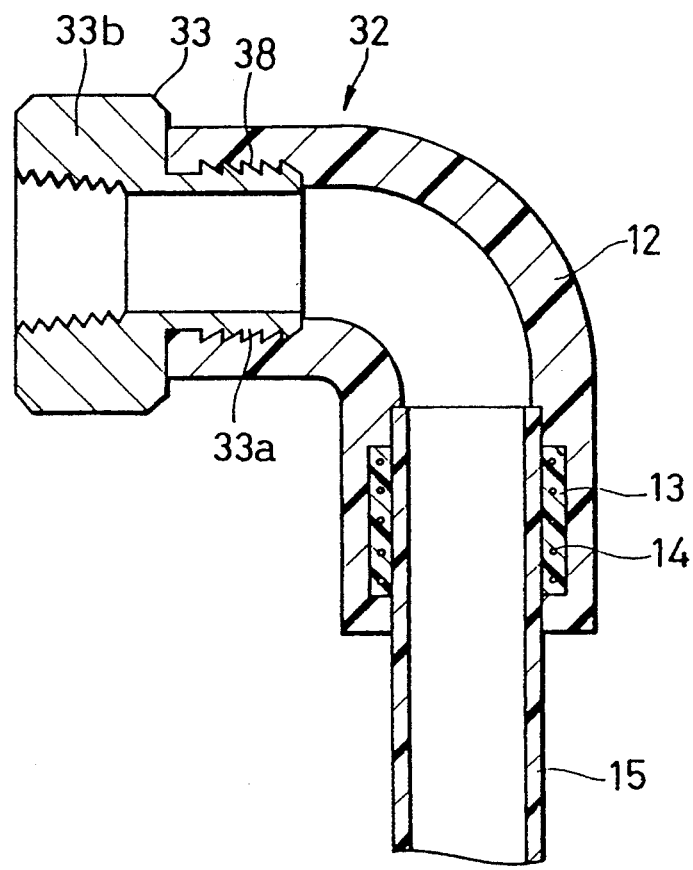

FIGS. 8 and 9 are cross sections showing other examples of the electrofusion joint according to the fourth embodiment of the present invention. In the embodiment shown in FIG. 8, the inserted portion 33a of the connecting member 33 is secured to the crosslinked polyolefin layer 12 by means of a screw 38. The projection 33b has a flange 33c which engages a socket 39 for providing connection to a connecting terminal such as a nozzle.

In the embodiment shown in FIG. 9, the crosslinked polyolefin layer 12 is in elbow form and the inserted portion 33a of the connecting member 33 is secured to an end of the elbow by means of a screw 38. The projection 33b of the connecting member 33 is in socket form which is adapted to connect to a connecting terminal such as a nozzle.

Figure 7A:
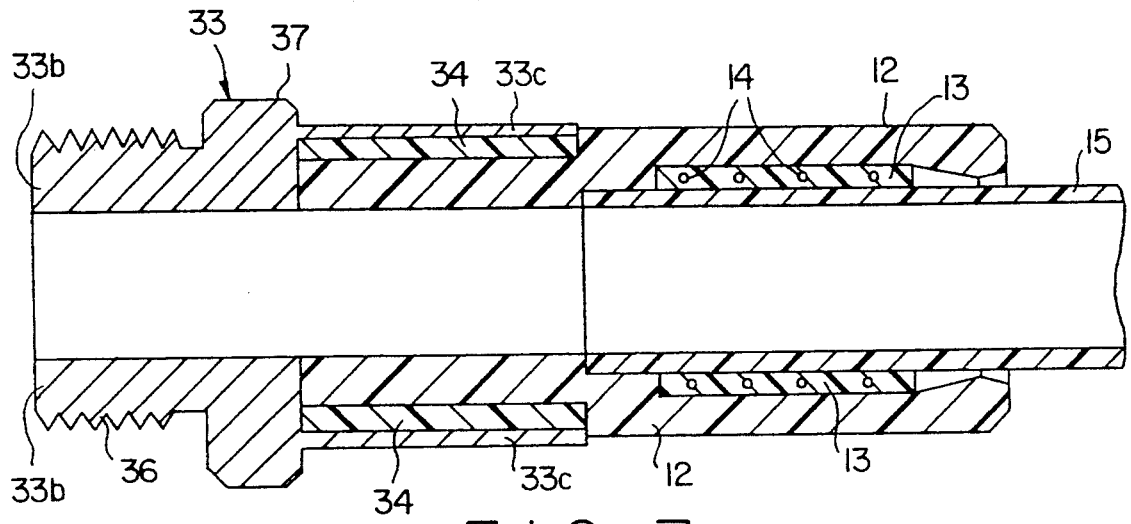
FIG. 7a is a cross-section, similar to FIG. 7, of an electrofusion joint with a modified form of the connecting member according to the fourth embodiment of the invention.

In the embodiments described above, the modified polyolefin layer 34 is formed separately as a layer of adhesive material. If desired, the modified polyolefin may be dispersed in the crosslinked polyolefin layer 12. The shapes and structures of the crosslinked polyolefin layer 12 and the non-crosslinked polyolefin layer 13 are not limited to those showing in FIGS. 7 to 9 and various modifications are possible. Similarly, as shown in FIG. 7a, connecting member 33 may be fitted over and fixedly secured at portion 33c to the tubular end of the crosslinked polyolefin layer 12 via modified polyolefin layer 34.

The electrofusion joint fitted with a connecting member according to the fourth embodiment of the present invention is applicable to every shape and structure of electrofusion joint according to the first embodiment as long as it has plurality of open ends, one of which is provided with a connecting portion having a connecting member secured thereto.

As described above, the electrofusion joint according to the fourth embodiment of the present invention has at least a connecting portion that has a connecting member secured to a crosslinked thermoplastic resin layer, and at least a joining portion that comprises a non-crosslinked thermoplastic resin layer formed as an integral part of the crosslinked thermoplastic resin layer and a heating electric wire provided either within or in the outer or inner surface of said non-crosslinked thermoplastic layer. Hence, this electrofusion joint fitted with a connecting member performs satisfactorily at elevated temperatures as evidenced by high heat resistance and exhibits good sealing property. In addition, this joint can be handled efficiently in such operations as mounting members to be joined.

The fifth embodiment of the present invention is described below with reference to FIGS. 10 to 12. The electrofusion joint according to the fifth embodiment has at least one electrofusion joining portion provided with a support of the member to be joined as in the second embodiment and at least one connecting portion having a connecting portion as in the fourth embodiment. As in the electrofusion joint according to the second embodiment, the support of the member to be joined may be formed as an integral part of the crosslinked thermoplastic resin layer or the non-crosslinked thermoplastic resin layer. Alternatively, the support may be formed as an integral part of the connecting member, or it may be formed of other materials. The groove into which the member to be joined is to be inserted may be formed in such a way that it opens at one end of the electrofusion joint.

The electrofusion joint equipped with a connecting member according to the fifth embodiment of the present invention can be fabricated by the same procedure as adopted in the fourth embodiment. The adhesive material for adhering the connecting member to the joint need not be coated on the connecting member but may be dispersed in the crosslinkable thermoplastic resin which is to be injected into the mold cavity. The support of the member to be joined may be preliminarily formed as an integral part of the connecting member. Alternatively, it may be formed as an integral part of the crosslinkable thermoplastic resin layer which is to form the crosslinked thermoplastic resin layer.

The fifth embodiment of the present invention is described below with reference to the preferred examples shown in FIGS. 10 to 12, which are cross sections showing three different examples of the electrofusion joint equipped with a connecting member according to the fifth embodiment.

The electrofusion joints with a connecting member that are indicated by 40 and 41 in FIGS. 10 and 11 are the same as the electrofusion joints shown in FIGS. 4 and 5 except that one end thereof (the left open end as viewed in these drawings) is formed as a connecting portion fitted with a connecting member as on the left end of the electrofusion joint 30 shown in FIG. 7. Thus, the same components are identified by like numerals and will not be described in detail.

The electrofusion joint 40 shown in FIG. 10 has the following essential components: a tubular crosslinked polyolefin layer 12 forming the main body of the joint; an electrofusion joining portion that comprises a non-crosslinked polyolefin layer 13 formed as an integral part of the crosslinked polyolefin layer 12 on the inner surface at one end (on the right side as viewed in FIG. 10) in the area where it contacts the member to be joined 15, a heating electric wire 14 provided either within or on the outer or inner surface of said non-crosslinked polyolefin layer 13, and a support 23 of the member 15 provided in such a way as to form a groove 22 inwardly of the non-crosslinked polyolefin layer 13 into which the member 15 is to be inserted; and a connecting portion that comprises a connecting member 33 secured to the other end (on the left side as viewed in FIG. 10) of the crosslinked polyolefin layer 12 by being inserted inwardly of the same, and a modified polyolefin layer 34 serving as an adhesive material which is provided between the inserted portion 33a of the connecting member 33 and the crosslinked polyolefin layer 12.

According to the fifth embodiment, the support 23 is formed as an integral part of the crosslinked polyolefin layer 12 in the example shown in FIG. 10 by being made of a crosslinked polyolefin, and it is formed as an integral part of the non-crosslinked polyolefin layer 13 in the example shown in FIG. 11 by being made of a non-crosslinked polyolefin.

In the electrofusion joint 42 fitted with connecting member and which is shown in FIG. 12, the support 23 extends as an integral part of the inserted portion 33a of the connecting member 33 in such a way as to form the groove 22 between said support and the non-crosslinked polyolefin layer 13, into which groove the member to be joined is to be inserted.

The electrofusion joint 42 having the construction described above may be fabricated by the following procedure: the non-crosslinked polyolefin layer 13 having the heating electric wire 14 either buried within or in its outer or inner surface or wound around its surface, as well as the inserted portion 33a of the connecting member 33 coated with the modified polyolefin layer 34 on the outer surface and the support 23 are inserted into an injection mold cavity; subsequently, a crosslinkable polyolefin containing a crosslinking agent, a crosslinking aid, etc. in a polyolefin is injected and laminated on the non-crosslinked polyolefin layer 13, the connecting member 33 and the support 23 to form an integral assembly; and thereafter said crosslinkable polyolefin layer is crosslinked to form the crosslinked polyolefin layer 12.

Each of the electrofusion joints 40, 41 and 42 according to the fifth embodiment can be connected to a connecting terminal such as a nozzle on a conduit header by threading the screw 36 in the projection 33b of the connecting member 33 into said terminal. Subsequently, the member to be joined 15 such as a polyolefin tube is inserted into the groove 22 and the non-crosslinked polyolefin layer 13 integral with the crosslinked polyolefin layer 12 will thermally melt to fuse to become an integral part of the member 15. Thus, the joints 40, 41 and 42 according to the fifth embodiment not only have high ability to retain their own shape but also exhibit good sealing performance which will be maintained for a prolonged period even if they are used to join hot water supply pipes.

As the non-crosslinked polyolefin layer 13 melts, the member 15 which is made of a thermoplastic resin will soften but will not deform since its inner surface is supported by the support 23. Thus, the fluid channel of the member 15 will not become narrow but maintains a cross-sectional area substantially the same as before the member 15 was joined.

As described above, the electrofusion joint fitted with a connecting member according to the fifth embodiment of the present invention has both the joining portion used in the second embodiment and the connecting portion fitted with a connecting member as in the fourth embodiment. Thus, the joint can be designed according to the various examples of these previous embodiments to exhibit the advantages they attain.

As described in detail on the foregoing pages, the electrofusion joint equipped with a connecting member according to the fifth embodiment of the present invention has both a connecting portion to which a connecting member is secured and a joining portion having a non-crosslinked thermoplastic resin layer furnished with heating electric wire and a support of a member to be joined. This joint can be easily connected to a connecting terminal such as a nozzle on a conduit header for supplying hot water. Further, the joint will perform satisfactorily at elevated temperatures as evidenced by high heat resitance and exhibits good sealing property. In addition, this joint is capable of joining various members without causing their deformation and it can be handled efficiently in mounting and various other operations.

The sixth embodiment of the present invention is described below with reference to FIGS. 13 to 18. The electrofusion joint according to the sixth embodiment has a first connecting portion and a second connecting portion. The first connecting portion is saddle-shaped joining portion having the construction described in connection with the first embodiment, and the second connecting portion is on the top of this saddle-shaped joining portion.

The second connecting portion may be of any construction. For example, it may have the same construction as the first connecting portion which is an electrofusion joining portion comprising a crosslinked thermoplastic resin layer, a non-crosslinked thermoplastic resin layer and a heating electric wire. It may be fitted with a fastening device or some other connecting member as in the fourth embodiment. Alternatively, a dual structure consisting of a crosslinked thermoplastic resin layer and a non-crosslinked thermoplastic resin layer may be coupled to another electrofusion joint.

The electrofusion joint according to the sixth embodiment of the present invention can be fabricated by the following procedure: to begin with, as in the first embodiment, a non-crosslinked thermoplastic resin layer shaped like a saddle which has a heating electric wire buried either within or in its outer or inner surface is positioned in a mold cavity, and a crosslinkable thermoplastic resin layer is injected and laminated in saddle form over the non-crosslinked thermoplastic resin layer, and subsequently crosslinked to form the crosslinked thermoplastic resin layer; the resulting joining portion is used as the first connecting portion; thereafter, the second connecting portion is formed as an integral part on the top of the saddle-shaped crosslinked thermoplastic resin layer in the first connecting member.

The thus fabricated electrofusion joint is used in the following manner: the first connecting portion is mounted on the lateral side of a member to be joined such as a tube having a thermoplastic resin layer in such a way that the non-crosslinked thermoplastic resin layer will contact said member to be joined; then, as in the first embodiment, an electric current is applied to the heating electric wire, whereupon the non-crosslinked thermoplastic resin layer will melt and fuse to the member of interest as an integral part thereof.

Subsequently, the connecting terminal of another member to be joined is connected to the second connecting portion formed on the top of the first connecting portion, and this enables the second member to be connected to any desired part of the lateral side of the first member.

The second connecting portion of the electrofusion joint may be formed by repeating the procedure of fabricating a joining portion as described in connection with the first embodiment and the fabricated joining portion can be fused as an integral part of a member to be joined such as a tube having a thermoplastic resin layer.

The second connecting portion having a connecting member as in the fourth embodiment may be obtained by shaping a non-crosslinked thermoplastic resin layer together with connecting member positioned in a mold cavity. The connecting member can be securely adhered to this connecting member if shaping is performed with an adhesive material such as a modified thermoplastic resin being coated in the area where the connecting member is buried. The second connecting portion thus obtained may be connected to the connecting terminal of another member to be joined by making use of mechanical connecting means such as a screw or a coupler.

The second connecting portion of a dual structure may be obtained by molding a non-crosslinked thermoplastic resin layer on the circumference of a crosslinked thermoplastic resin layer as an integral part thereof by repeating the procedure described above. The resulting connecting portion has a fusible non-crosslinked thermoplastic resin layer on its circumference. This second connecting portion can be connected to another member to be joined by bringing it into end-to-end relationship with the connecting terminal of this member and covering the entire circumference of the mating portion and nearby areas with another electrofusion joint.

Figure 16:
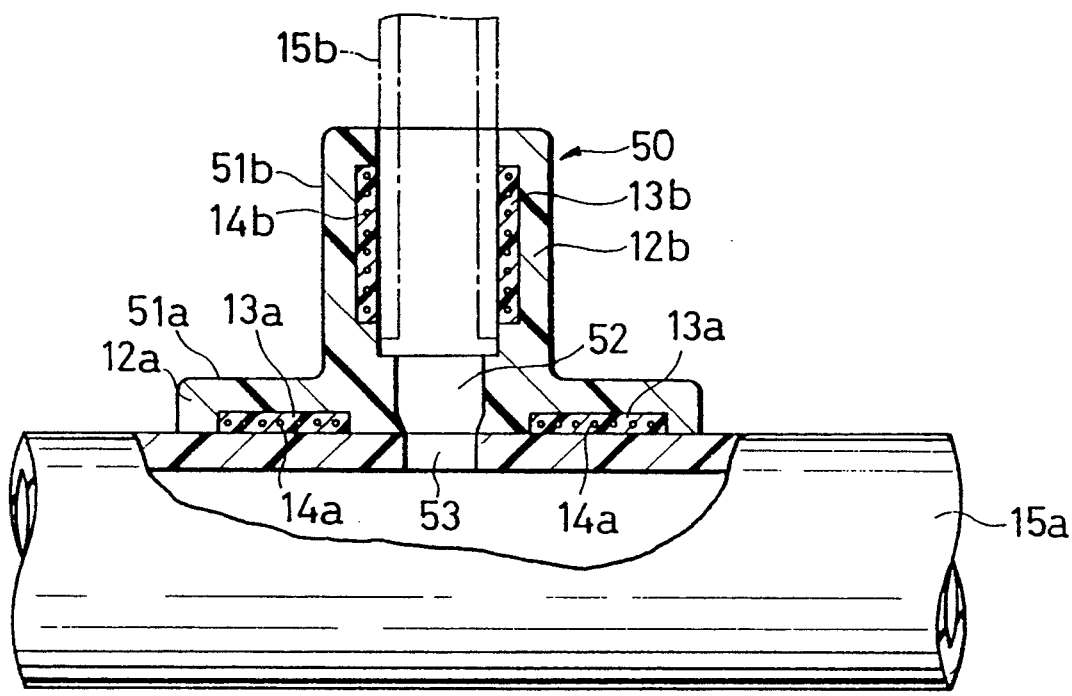
FIG. 16 is a partial fragmentary front view of the same electrofusion joint that includes a cross section taken on line B—B of FIG. 14 and which illustrates how the joint is mounted on a member to be joined.

Specific examples of the sixth embodiment of the present invention are hereunder described with reference to FIGS. 13 to 18. FIG. 13 is a front view of an electrofusion joint according to an example of the sixth embodiment. FIG. 14 is a cross section taken on line A—A of FIG. 13. FIG. 15 is a bottom view of the joint shown in FIG. 13. FIG. 16 is a cross section taken on line B—B of FIG. 14 and show how the joint is mounted on a member to be joined. The electrofusion joint generally indicated by 50 has the first connecting portion 51a formed at one end as a saddle-shaped joining portion and the second connecting portion 51b integral with the first connecting portion 51a which is formed as a tubular joining portion in the center of the top of 51a. The first connecting portion 51a has a crosslinked polyolefin layer 12a in saddle shaped having an opening 52 in the central area, a non-crosslinked polyolefin layer 13a in saddle shaped formed as an integral part of the crosslinked polyolefin layer 12a on the inner surface thereof at the position where it contacts a member to be joined 15a, and a heating electric wire 14a provided within the non-crosslinked polyolefin layer 13a in saddle shape.

The second connecting portion 51b has a tubular crosslinked polyolefin layer 12b formed as an integral part of the crosslinked polyolefin layer 12a, a tubular non-crosslinked polyolefin layer 13b formed as an integral part of the crosslinked polyolefin layer 12b on the inner surface thereof at the position where it contacts another member to be joined 15b, and a heating electric wire 14b provided within the non-crosslinked polyolefin layer 13b.

Each of the members 15a and 15b is a pipe having a layer of thermoplastic resin such as polyethylene. While they may be totally made of a fusible thermoplastic resin, those which are made of heat-resistant materials such as crosslinked polyolefins should be coated with fusible thermoplastic resin on their outer surface. The member 15a has a bypass hole 53 in its lateral side on a position that corresponds to the opening 52.

The electrofusion joint 50 having the construction described above can be fabricated by the following procedure: non-crosslinked polyolefin layers 13a and 13b having heating electric wires 14a and 14b buried therein are inserted into a mold cavity; a crosslinkable polyolefin containing a crosslinking agent, a crosslinking aid, a catalyst, etc. in a polyolefin is injected and laminated on the non-crosslinked polyolefin layers 13a and 13b to form an integral assembly; thereafter, the crosslinkable polyolefin layer is crosslinked to form crosslinked polyolefin layers 12a and 12b.

The thus fabricated electrofusion joint 50 is used in the following manner: it is first mounted in such a way that the non-crosslinked polyolefin layer 13a in saddle shape will contact the lateral side of the member 15a such as a polyolefin tube; when an electric current is applied to the electric wire 14a, the non-crosslinked polyolefin layer 13a will melt and fuse to become an integral part of member 15a. After the melting and fusing, the bypass hole 53 is formed on the lateral side of the member 15a, which is positioned corresponding to the openings 52, using a tool for making a hole.

Subsequently, the end of the other member to be joined 15b is inserted into the second connecting portion 51b until it contacts the non-crosslinked polyolefin layer 13b; when an electric current is applied to the electric wire 14b, the non-crosslinked polyolefin layer 13b will fuse to become an integral part of member 15b.

Thus, two members 15a and 15b will connect to each other via the bypass hole 53 and the opening 52.

In the electrofusion joint 50 described above, the crosslinked-polyolefin layers 12a and 12b forming the main body of the joint are responsible for imparting heat resistance to the joint. Hence, the joint is capable of retaining its own shape in an effective way even if it is used to join hot water supply pipes. Further, the non-crosslinked polyolefin layers 13a and 13b which are integral parts of the crosslinked polyolefin layers 12a and 12b, respectively, will fuse to the members 15a and 15b to become integral parts thereof. Hence, the joint has good sealing property which is maintained for a prolonged period even if it is used to join hot water pipes.

Figure 17:
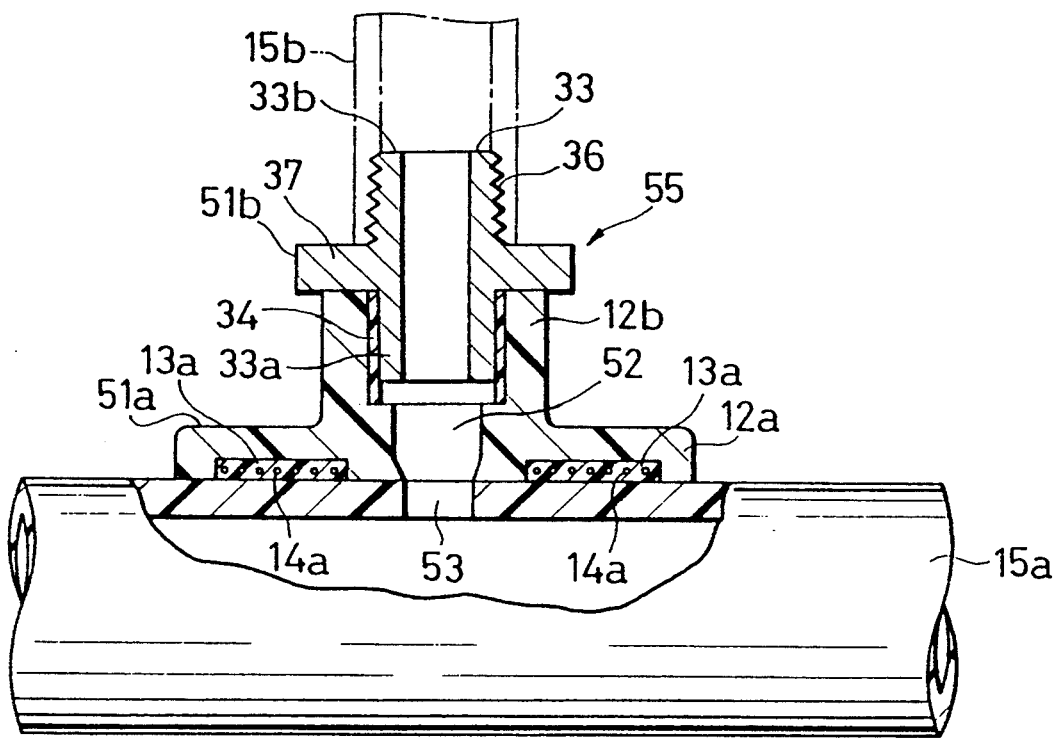
FIGS. 17 and 18 are partial fragmentary front views showing how two other examples of the electrofusion joint according to the sixth embodiment of the present invention are mounted on the member to be joined.
Figure 18:
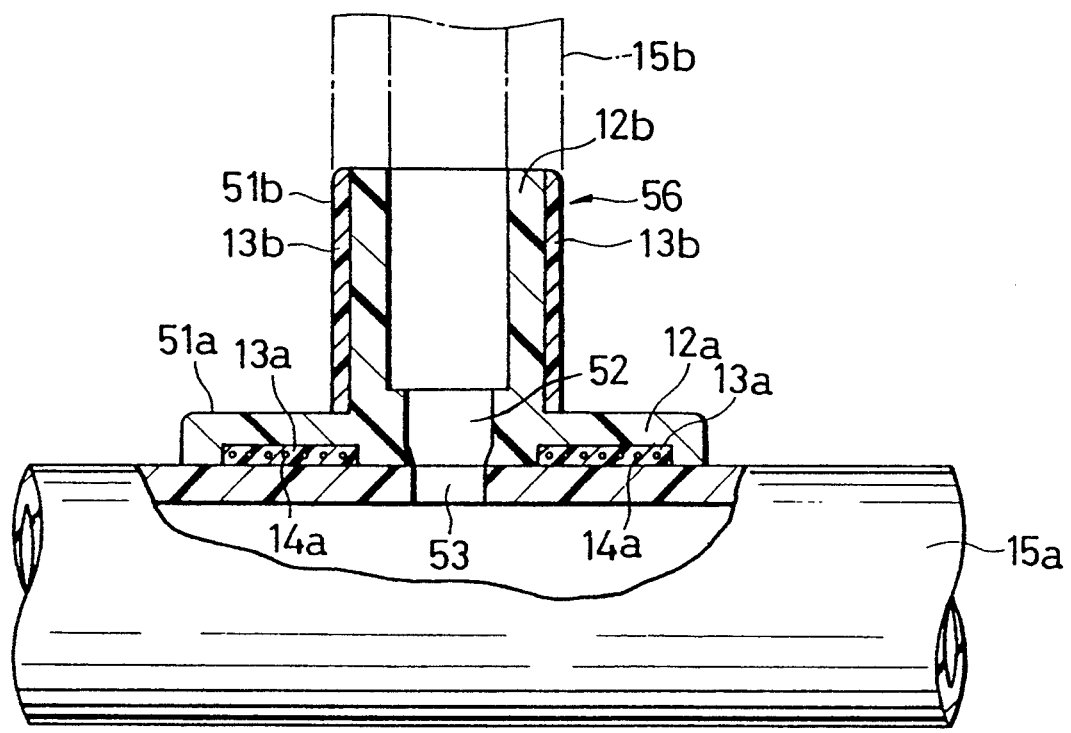

FIGS. 17 and 18 show other examples of the sixth embodiment and they are equivalent to cross sections taken on line B—B of FIG. 14. In each of the electrofusion joints indicated by 55 and 56, the first connecting portion 51a is composed of a joining portion that is shaped like a saddle as in the example shown in FIGS. 13 to 16.

In the electrofusion joint 55 shown in FIG. 17, the second connecting portion 51b is such that the inserted portion 33a of a connecting member 33 is securely adhered by means of an adhesive layer 34 such as a modified polyolefin layer to the tubular crosslinked polyolefin layer 12b shaped as an integral part of the crosslinked polyolefin layer 12a. The connecting member 33 is a metal tube which has on its projection 33b a screw or some other means 36 by which it is joined to member 15b. A hexagonal flange 37 which is to be gripped with a spanner is formed midway between 33a and 33b.

With the connecting member 33 inserted into an injection mold cavity as in the fourth embodiment, the electrofusion joint 55 having the construction described above is fabricated by the procedure already described in connection with the fourth embodiment. The first connecting portion 51a is connected to member 15a in the manner already described. The second connecting portion 51b is joined to the other member 15b by the joining means 36. The joining means 36 by which the connecting member 33 is joined to member 15b may assume another form such as a socket having a female screw.

In the example shown in FIG. 18, the second connecting portion 51b may consist of a crosslinked polyolefin layer 12a, a tubular crosslinked polyolefin layer 12b formed as an integral part thereof, and a tubular non-crosslinked polyolefin layer 13b laminated on the circumference of layer 12b as an integral part thereof.

The electrofusion joint 56 having the construction described above is fabricated by the procedure already described, with the non-crosslinked polyolefin layer 13b being shaped by lamination over the tubular crosslinked polyolefin layer 12b as an integral part thereof. The second connecting portion 51b may be connected to the member 15b by means of another electrofusion joint. Alternatively, it may be directly connected to a member constructed as an electrofusion joint.

The construction of the second connecting portion 51b described above is not limited to those shown in FIGS. 13 to 18. The heating electric wires 14a and 14b may be provided on either the outer or inner surface of the non-crosslinked polyolefin layers 13a and 13b.

As described in detail on the foregoing pages, the electrofusion joint according to the sixth embodiment of the present invention has a joining portion comprising a crosslinked thermoplastic resin layer in saddle form, a non-crosslinked thermoplastic resin layer formed as an integral part of said crosslinked thermoplastic resin layer, and a heating electric wire provided either within or on the outer or inner surface of said non-crosslinked thermoplastic resin layer. Hence, this joint enables one member to be fused to the lateral side of another member while performing satisfactorily at elevated temperatures as evidenced by high heat resistance and exhibiting good sealing property. In addition, this joint can be handled efficiently in mounting and various other operations.

Figure 19:
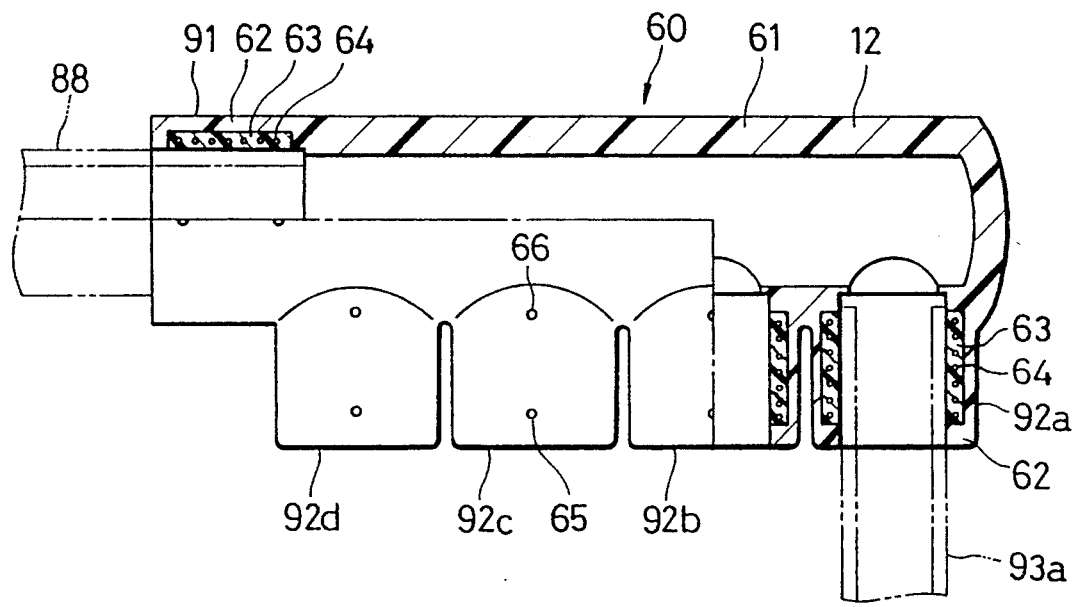
FIGS. 19 and 20 are partial fragmentary front views of two examples of a header for supplying hot water according to the seventh embodiment of the present invention.

The seventh embodiment of the present invention is described below with reference to FIGS. 19 and 20. This embodiment provides a header for distributing hot water from a heat source providing apparatus. The header comprises a header body shaped of a crosslinked thermoplastic resin in a hollow form, a receptacle provided on the inlet side of said header body and at least one receptacle on the outlet side, at least part of which receptacles is an electrofusion joining portion of the same type as used in the first embodiment which comprises a crosslinked thermoplastic resin and a non-crosslinked thermoplastic resin having a heating electric wire provided either within or on its outer or inner surface.

When the non-crosslinked thermoplastic resin layer and the heating electric wire are to be formed at one or more receptacles, the other receptacles may be fitted with connecting member commonly used to establish connection to pipes. An illustrative connecting member is a metal tube having at one end a screw or some other means for establishing coupling to connecting terminals. The connecting member is preferably secured to the crosslinked thermoplastic resin layer by means of bonding with an adhesive material such as a modified thermoplastic resin. The adhesive material is preferably interposed between the connecting member and the crosslinked thermoplastic resin layer but if desired, it may be dispersed in the crosslinked thermoplastic resin layer.

The header according to the seventh embodiment of the present invention is fabricated by the following procedure: a tubular non-crosslinked thermoplastic resin layer having a heating electric wire provided either within or on its outer or inner surface is inserted into an injection mold cavity; a crosslinkable thermoplastic resin is injected and laminated on the non-crosslinked thermoplastic resin layer to form an integral unit; thereafter, the crosslinkable thermoplastic resin layer is crosslinked to form the crosslinked thermoplastic resin layer. If a connecting member is necessary, it may be attached to the completed header. Alternatively, it may be injection molded together with the other components, with it being inserted into the mold cavity after it was coated with an adhesive material such as a modified thermoplastic resin. In this latter case, the adhesive material need not be coated on the non-crosslinked thermoplastic resin layer but may be dispersed in the crosslinkable thermoplastic resin to be injected.

The so fabricated header is used with the water supply main from the heat source providing apparatus being connected to the receptacle on the inlet side and branch pipes to the necessary faucets being connected to the receptacles on the outlet side. In the case where a connecting member is used, the header is installed in such a way that the connecting member is connected to the connecting terminal of a member to be joined (i.e., a pipe) whereas a plastic pipe such as a thermoplastic tube is brought into contact with the non-crosslinked thermoplastic layer. When an electric current is applied to the heating electric wire, the non-crosslinked thermoplastic resin will melt and fuse to become an integral part of the plastic pipe. This enables the header to be connected to all pipes in a leak-free and reliable manner.

As in the case of members to be joined by the electrofusion joints described on the foregoing pages, pipes to be connected to the header are preferable such that the surface layer or the entire portion is made of a thermoplastic resin, in particular, a miscible thermoplastic resin. Pipes made of non-crosslinked thermoplastic resins such as polyolefins will exhibit particularly good fusing ability.

The header for supplying hot water according to the seventh embodiment of the present invention is described below in a specific way by reference to the preferred examples shown in FIGS. 19 and 20, which are partial fragmentary front views of two different examples of the header.

The header generally indicated by 60 is composed of a hollow header body 61 and a crosslinked polyolefin layer 62 forming a tubular receptacle 91 on the inlet side and a plurality of tubular receptacles 92a, 92b, 92c and 92d on the outlet side. The header body and the receptacles are shaped of a crosslinked polyolefin into an integral unit. The receptacle 91 on the inlet side is open at one end of the header 60 whereas the receptacles 92a, . . . on the outlet side which are arranged in a row are open in a direction perpendicular to the receptacle 91.

All receptacles 91, 92a, 92b, 92c and 92d (in the example shown in FIG. 19) or receptacles on the outlet side 92a–92d (in the example shown in FIG. 20) have the following construction: on the inner surface of the tubular crosslinked polyolefin layer 62 shaped as an integral part of the header body 61, a tubular non-crosslinked polyolefin layer 63 is laminated to become an integral part of the crosslinked polyolefin layer 62, and a coil of heating electric wire 64 is buried within the non-crosslinked polyolefin layer 63 and connected to terminals 65 and 66 to form an electrofusion joining portion of the same type as described in connection with the first embodiment. A connecting member 33 is attached to the receptacle 91 on the inlet side of the header shown in FIG. 20.

The connecting member 33 is a metal tube which has a screw 36 formed on the projection 33b on the side opposite to the inserted portion 33a to serve as connecting means. A hexagonal flange 37 which is to be gripped with a spanner is formed midway between 33a and 33b. A modified polyolefin layer 34 is disposed along the entire circumference of the space between the inserted portion 33a of the connecting member 33 and the crosslinked polyolefin layer 62 to adhere them together.

The header 60 having the construction described above is fabricated by the following procedure: the non-crosslinked polyolefin layer 63 having the heating electric wire 64 either buried within or on its outer or inner surface or wound around its surface is inserted into an injection mold cavity; a crosslinkable polyolefin containing a crosslinking agent, a crosslinking aid, etc. in a polyolefin is injected and laminated over the non-crosslinked polyolefin layer 63 to form an integral unit; thereafter, the crosslinkable polyolefin layer is crosslinked to form the crosslinked polyolefin layer 62. The connecting member 33 may be either attached to the completed header or injection molded together with the other components, with the inserted portion 33a of the connecting member 33 being inserted into the mold cavity after it was coated with the modified polyolefin layer 34 on the outer surface.

The thus fabricated header 60 is used in such a way that the water main 88 from the heat source providing apparatus 82 (see FIG. 23) is connected to the receptacle 91 on the inlet side whereas branch pipes 93a, 93b, 93c and 93d to faucets 83, 84, 85, etc. are connected to the receptacles 92a, 92b, 92c and 92d, respectively, on the outlet side. If the header is fitted with the connecting member 33 as shown in FIG. 20, said member is connected to the connecting terminal of the water main 88 whereas branch pipes 93a, 93b, 93c and 93d which are made of plastics such as polyolefins are mounted in such a way that they contact the non-crosslinked polyolefin layer 63 in receptacles 92a, 92b, 92c and 92d as shown in FIG. 23. In the example shown in FIG. 19, both the water main 88 and branch pipes 93a, 93b, 93c and 93d are connected to the receptacles 91, 92a, 92b, 92c and 92d in such a way that they contact the non-crosslinked polyolefin layer 63 in these receptacles as shown in FIG. 23. Thereafter, an electric current is applied to the electric wire 64 via terminals 65 and 66, whereupon the non-crosslinked polyolefin layer 63 will melt and fuse to become an integral part of each pipe to be connected. This insures that the header 60 is positively connected to the necessary pipes in a leak-free way.

The connecting member 33 is suitable for establishing connection to metal pipes whereas the electrofusion joint is suitable when a plastic pipe is to be connected. Thus, the layout of these devices can be determined in accordance with the specific pipe to be joined.

The header 60 has the crosslinked polyolefin layer 62 as a member responsible for imparting heat resistance, so it is capable of retaining its own shape effectively even if it is used to join hot water pipes. Further, the non-crosslinked polyolefin layer 63 has fused to become an integral part of the crosslinked polyolefin layer 62 together with the connecting member 33, so the header will exhibit good sealing property which is maintained for a prolonged period even if it is used to join hot water pipes.

Figure 20:
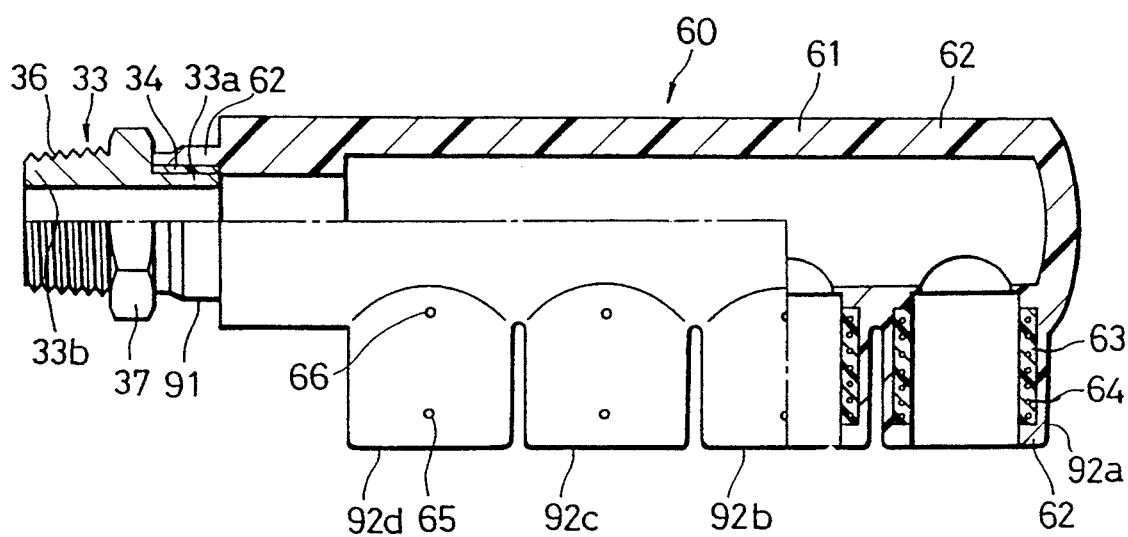

In the example shown in FIG. 20, the connecting member 33 is fitted to the receptacle 91 on the inlet side but it may be attached to one or more of the receptacles on the outlet side. The connecting member 33 may have connecting means other than screws.

As described on the foregoing pages, the header according to the seventh embodiment of the present invention has an electrofusion joining portion that comprises a non-crosslinked thermoplastic resin layer and a heating electric wire and that is fitted to at least one of the receptacles on the header body made of a crosslinked thermoplastic resin. Because of this arrangement, the header has high heat resistance, exhibits good sealing performance, is lightweight and resistant to corrosion, can be easily connected to plastic pipes, and is suitable for large-scale production.

The eighth embodiment of the present invention is described below with reference to FIGS. 21 and 22. The header for supplying hot water according to the present invention comprises a header body shaped of a crosslinked thermoplastic resin in hollow form and a plurality of receptacles on the outlet side of the header body which are formed of a crosslinked thermoplastic resin as an integral part of said header body in such a way that said tubular resin layer has a bore diameter sufficient to admit the flow rate of hot water distributed to each receptacle.

Preferably, the receptacle on the inlet side and the plurality of receptacles on the outlet side are each made of a laminate of the tubular crosslinked thermoplastic resin layer and a tubular non-crosslinked thermoplastic resin layer that is capable of joining by fusion. More preferably, each of these receptacles is an electrofusion joining portion that has a heating electric wire provided either within or on its outer or inner surface as in the first embodiment.

In fabricating the header according to the eighth embodiment, an injection mold must be employed whose cavity configuration is such that a plurality of receptacles having different bore diameters can be molded on the outlet side. Lamination of a non-crosslinked thermoplastic resin layer on a receptacle, placement of a heating electric wire and fixation of a connecting member can be performed in entirely the same manner as in the seventh embodiment and will not be described in detail.

The so fabricated header is used with the water supply main from the heat source providing apparatus being connected to the receptacle on the inlet side and branch pipes to the necessary faucets being connected to the receptacles on the outlet side. The receptacles on the outlet side having different bore diameters are connected to branches having the corresponding bore diameters. In the case where a connecting member is attached to a receptacle, it is coupled to the connecting terminal of the pipe to which said receptacle is to be connected. In the case where a non-crosslinked thermoplastic resin layer is laminated on a receptacle, a plastic pipe such as a thermoplastic resin tube is mounted in such a way that it contacts the non-crosslinked thermoplastic resin layer and thereafter connected by some other means such as an electrofusion joint. If both a non-crosslinked thermoplastic resin layer and a heating electric wire are to be provided on a receptacle, the pipe to be connected is mounted in the same way and a current is applied to the electric wire, whereupon the non-crosslinked thermoplastic resin layer will melt and fuse as an integral part of the pipe. Thus, either method insures that the header is positively connected to the necessary pipe in a leak-free way.

Figure 21:
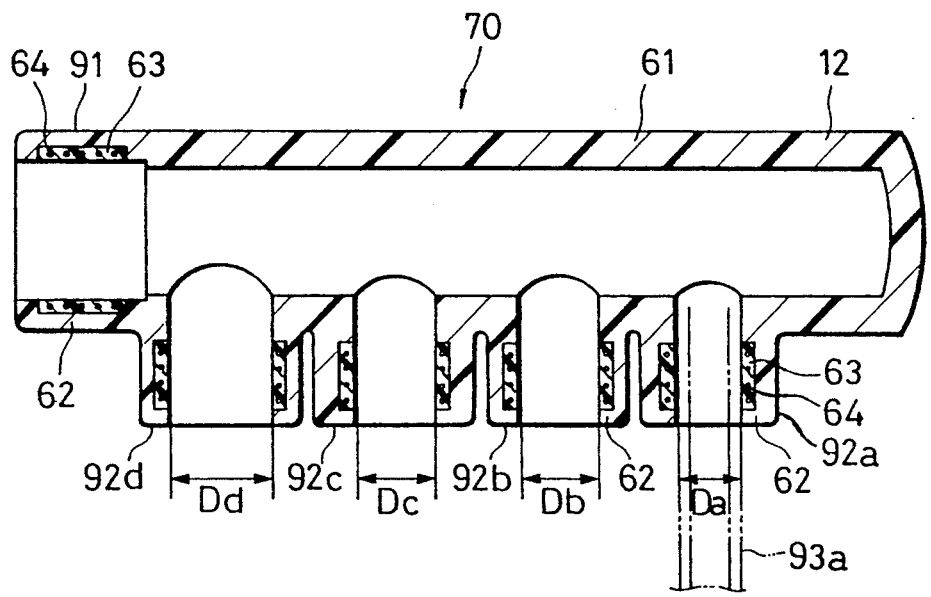
FIGS. 21 and 22 are partial fragmentary front views of two examples of a header for supplying hot water according to the eighth embodiment of the present invention.
Figure 22:
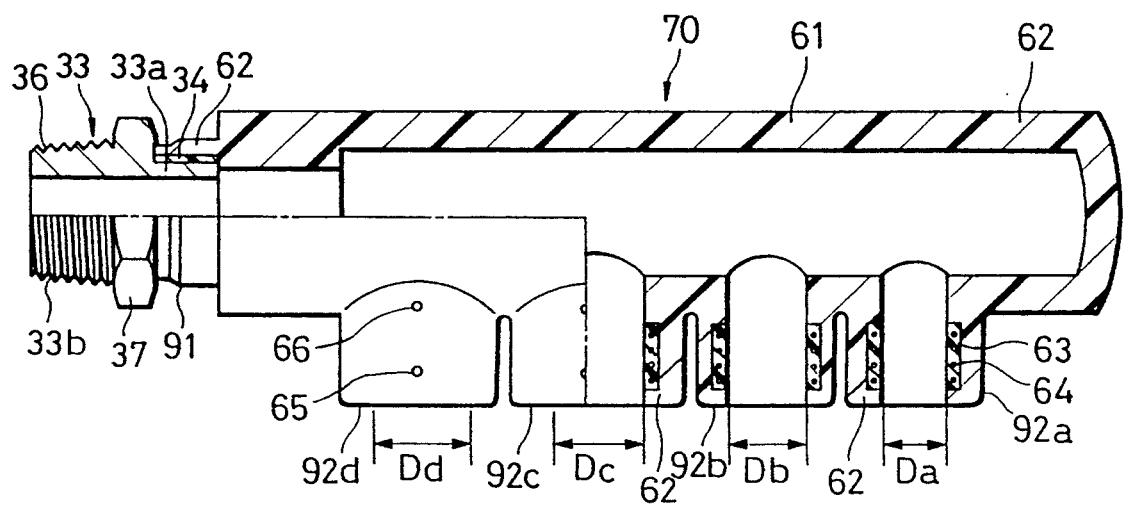

Two different examples of the header according to the eighth embodiment of the present invention are shown in FIGS. 21 and 22. The headers shown in these drawings are identical to those shown in FIGS. 19 and 20, respectively, according to the seventh embodiment except that the receptacles on the outlet side of the header body have different bore diameters, so the same components are identified by like numerals and will not be described in detail.

In the header generally indicated by 70 in FIGS. 21 and 22, the receptacle 91 on the inlet side open at one end of the header whereas the receptacles 92a, 92b, 92c and 92d on the outlet side which are arranged in a row are open in a direction perpendicular to the receptacle 91 and have different bore diameters Da, Db, Dc and Dd that are sufficient to admit the flow rate of hot water distributed to each receptacle.

The header 70 having the construction described above is used with the water main 88 from the heat source providing apparatus 82 being connected to the receptacle 91 on the inlet side and with differently sized branch pipes 93a, 93b, 93c and 93d to faucets 83, 84, 85, etc. being connected to receptacles 92a, 92b, 92c and 92d on the outlet side which have bore diameters corresponding to those of the associated branch pipes. If the header is fitted with the connecting member 33 as shown in FIG. 22, said member is connected to the connecting terminal of the water main 88 whereas branch pipes 93a, 93b, 93c and 93d which are made of plastics such as polyolefins are mounted in such a way that they contact the non-crosslinked polyolefin layer 63 in receptacles 92a, 92b, 92c and 92d as shown in FIG. 23. In the example shown in FIG. 21, both the water main 88 and branch pipes 93a, 93b, 93c and 93d are connected to the receptacles 91, 92a, 92b, 92c and 92d in such a way that they contact the non-crosslinked polyolefin layer 63 in these receptacles as shown in FIG. 23. Thereafter, an electric current is applied to the electric wire 64 via terminals 65 and 66, whereupon the non-crosslinked polyolefin layer 63 will melt and fuse to become an integral part of each pipe to be connected. This insures that the header 70 is positively connected to the necessary pipes in a leak-free way.

The header 70 has the crosslinked polyolefin layer 62 as a member responsible for imparting heat resistance, so it is capable of retaining its own shape effectively even if it is used to join hot water pipes. Further, the receptacles 92a, . . . on the outlet side of the header body have different bore diameters that are sufficient to admit the flow rate of hot water distributed to each receptacle, so they can be directly connected to branch pipes of different bore diameters without using reducers. Thus, the header insures effective sealing and high operational efficiency. In addition, the non-crosslinked polyolefin layer 63 has fused to become an integral part of the crosslinked polyolefin layer 62 together with the connecting member 33, so the header will exhibit good sealing property which is maintained for a prolonged period even if it is used to join hot water pipes.

In accordance with the eighth embodiment of the present invention, a header body and receptacles on its outlet side having different bore diameters are shaped as an integral unit by molding of a crosslinked thermoplastic resin. Thus, the resulting header has high heat resistance, is lightweight and resistant to corrosion, can be easily connected to plastic pipes having different bore diameters, and is suitable for large-scale production.

If a non-crosslinked thermoplastic resin layer and even a heating electric wire are provided at the receptacle on the inlet side or the plurality of receptacles on the outlet side, a header can be obtained that exhibits high sealing performance, particularly for a prolonged period, and that allows for easy connection to pipes.

EXAMPLES

The present invention is hereunder described in greater detail with reference to the following examples.

Example 1

A medium density polyethylene colored by using a coloring agent was used as the non-crosslinked thermoplastic resin 13 of the present invention. The colored medium density polyethylene crosslinked by using 1.5% by weight of a crosslinking agent (vinyl trimethoxysilane) was used as the crosslinked thermoplastic resin 12 of the present invention. A Ni-Cr alloy wire (0.3 mm $\phi$) was used as the material of the heating electric wire 14.

The electrofusion joint 20 having a structure as shown in FIG. 4, to which the tubes 15 and 16 to be connected having an adaptable caliber of 8 to 21.5 mm can be joined, was fabricated in accordance with the above-described methods.

The tubes 15 and 16 to be connected, which were made of the same materials and have an adaptable caliber, were inserted at one end into grooves on opposite sides of the electrofusion joint 20. Thereafter, an electric current was applied to the above-described heating electric wires 14 which have been connected to an external electric power for about 20 seconds by controlling the voltage in order to give an appropriate energy density. For example, conditions for the application of electric current in the case of an adaptable caliber (outer diameter) of the tubes being 13 mm were as follows: resistance of the heating electric wire 14, 14.5 $\Omega$; voltage, 40 V; and the application time, 20 seconds.

When sealing properties of the joining portion were checked after completion of the connection, no leakage was found for at least 100 hours under a pressure of 10 kg/cm$^2$ at 90° C., which confirmed similar sealing properties of the joint to those of the pipes to be connected. It was confirmed also that the joint can be handled more efficiently in mounting and other various operations than in the case of joining using wrenches and the like.

Example 2

A modified polyethylene 34 was prepared as the adhesive material for use in the connecting member 33 made of brass, by performing graft copolymerization of a medium density polyethylene and maleic acid by means of a melt kneading. Using the modified polyethylene thus prepared and the same resin materials and electric heating wire materials as described in Example 1, the electrofusion joint 40 equipped with the connecting member having the structure as shown in FIG. 10 wherein the adaptable caliber of the pipe 15 to be connected is 8 to 21.5 mm was fabricated in accordance with the above-described methods.

The pipe 15 to be connected made of the same material having an adaptable caliber was inserted into the joint, and the joining portion was connected by applying electric current to the above-described electric heating wires 14 in the same manner as described in Example 1.

When sealing properties of the joining portion were checked after completion of the connection, it was confirmed that the joint had similar sealing properties to those of the pipes to be connected as the results described in Example 1. It was also confirmed that the joint can be handled more efficiently in mounting and other various operations than in the case of joining using wrenches and the like as described in Example 1.

What is claimed is:

1. An electrofusion joint comprising a main body portion comprised of a crosslinked thermoplastic resin and integrally molded therewith at least one joining portion which is adapted to be heat-welded to a pipe, wherein said main body portion has an interior surface and an exterior surface and a tubular configuration at the end opposite to said end provided with said joining portion;

said joining portion comprising a non-crosslinkable thermoplastic resin, and has an electrical heating wire associated in contact therewith so that the joining portion may be heat-welded to a pipe brought into contact with said joining portion;

said joining portion is embedded in at least one major surface of said main body portion without extending to the extreme end of the electrofusion joint;

a recess in the surface of the main body portion in which the joining portion is embedded, said recess being adjacent said joining portion on the side of the extreme end of the electrofusion joint without extending to the extreme end of the electrofusion joint;

said recess being capable of receiving the molten non-crosslinkable thermoplastic resin upon the electrofusion of the joint; and said electrofusion joint further comprising a connecting member fitted into and fixedly secured to said tubular end of the main body portion on its interior, said connecting member being provided with a mechanically connecting means, wherein said connecting member is firmly secured to said tubular end of the main body portion, by an intervening layer comprising a modified thermoplastic resin.

2. An electrofusion joint according to claim 1, wherein the crosslinked thermoplastic resin comprises a crosslinked polyolefin and the non-crosslinkable thermoplastic resin comprises a non-crosslinkable polyolefin.

3. An electrofusion joint comprising a main body portion comprised of a crosslinked thermoplastic resin and integrally molded therewith at least one joining portion which is adapted to be heat-welded to a pipe, said main body portion of the joint comprising an interior surface and an exterior surface and having a tubular configuration at the end opposite to the end provided with said joining portion;

said joining portion comprising a non-crosslinkable thermoplastic resin, and having an electrical heating wire associated in contact therewith so that the joining portion may be heat-welded to a pipe brought into contact with said joining portion;

said joining portion being embedded in at least one major surface of said main body portion without extending to the extreme end of the electrofusion joint; and a connecting member fitted into and fixedly secured to said tubular end of the main body portion on its interior, said connecting member being provided with a mechanically connecting means, wherein said connecting member is firmly secured to said tubular end of the main body portion, by an intervening layer comprising a modified thermoplastic resin.

4. An electrofusion joint according to claim 3, wherein the crosslinked thermoplastic resin comprises a crosslinked polyolefin and the non-crosslinkable thermoplastic resin comprises a non-crosslinkable polyolefin.

5. An electrofusion joint comprising a main body portion comprised of a crosslinked thermoplastic resin and integrally molded therewith at least one joining portion which is adapted to be heat-welded to a pipe, said main body portion of the joint comprising an interior surface and an exterior surface and having a tubular configuration at the end opposite to an end provided with said joining portion;

said joining portion comprising a non-crosslinkable thermoplastic resin, and having an electrical heating wire associated in contact therewith so that the joining portion may be heat-welded to a pipe brought into contact with said joining portion;

said joining portion being embedded in at least one major surface of said main body portion without extending to the extreme end of the electrofusion joint; and a connecting member fitted over and fixedly secured to said tubular end of the main body portion on its exterior, said connecting member being provided with a mechanically connecting means wherein said connecting member is firmly secured to said tubular end of the main portion, by an intervening layer comprising a modified thermoplastic resin.

6. An electrofusion joint according to claim 5, wherein the crosslinked thermoplastic resin comprises a crosslinked polyolefin and the non-crosslinkable thermoplastic resin comprises a non-crosslinkable polyolefin.

7. An electrofusion joint according to claim 6, wherein said modified thermoplastic resin comprises polyolefin graft copolymerized with an unsaturated carboxylic acid or an anhydride, amide or epoxide thereof.

8. An electrofusion joint comprising, a main body portion comprised of a crosslinked thermoplastic resin and integrally molded therewith;

at least one joining portion which is adapted to be heat-welded to a pipe;

said main body portion having an interior surface and an exterior surface and a tubular configuration at the end opposite to said end provided with said joining portion;

said joining portion comprising a non-crosslinkable thermoplastic resin and having an electrical heating wire associated in contact therewith so that the joining portion may be heat-welded to a pipe brought into contact with said joining portion;

said joining portion being embedded in at least one major surface of said main body portion without extending to the extreme end of the electrofusion joint;

said main body portion having a recess in the surface thereof in which the joining portion is embedded, said recess being adjacent said joining portion on the side of the extreme end of the electrofusion joint without extending to the extreme end of the electrofusion joint, and said recess being capable of receiving the molten non-crosslinkable thermoplastic resin upon the electrofusion of the joint;

said electrofusion joint further comprising a connecting member fitted over and fixedly secured to said tubular end of the main body portion on its exterior, said connecting member being provided with a mechanically connecting means, wherein said connecting member is firmly secured to said tubular end of the main body portion by an intervening layer comprising a modified thermoplastic resin.

9. An electrofusion joint according to claim 8, wherein the crosslinked thermoplastic resin comprises a crosslinked polyolefin and the non-crosslinkable thermoplastic resin comprises a non-crosslinkable polyolefin.

10. An electrofusion joint according to claim 9, wherein said modified thermoplastic resin comprises polyolefin graft copolymerized with an unsaturated carboxylic acid or an anhydride, amide or epoxide thereof.

* * * * *